United States Patent
Howard, Jr. et al.

(10) Patent No.: US 6,442,690 B1
(45) Date of Patent: Aug. 27, 2002

(54) APPARATUS AND METHODS FOR MANAGING KEY MATERIAL IN HETEROGENEOUS CRYPTOGRAPHIC ASSETS

(75) Inventors: James L. Howard, Jr., Glassboro; Pennington J. Hess, Cherry Hill; James A. MacStravic, Willingboro, all of NJ (US)

(73) Assignee: L3-Communications Corporation, New York, NY (US)

( * ) Notice: Subject to any disclaimer, the term of this patent is extended or adjusted under 35 U.S.C. 154(b) by 0 days.

(21) Appl. No.: 09/422,292

(22) Filed: Oct. 21, 1999

Related U.S. Application Data

(60) Provisional application No. 60/105,386, filed on Oct. 23, 1998.

(51) Int. Cl.[7] .................................................. H04L 9/32
(52) U.S. Cl. ...................................... 713/175; 713/156
(58) Field of Search ................................. 380/273, 282; 713/155–157, 168, 173, 175, 189; 705/71

(56) References Cited

U.S. PATENT DOCUMENTS

| | | | |
|---|---|---|---|
| 4,281,216 A | 7/1981 | Hogg et al. ............. 178/22.08 |
| 4,736,422 A | 4/1988 | Mason ........................ 380/20 |
| 5,093,860 A | 3/1992 | Steinbrenner et al. ........ 380/21 |
| 5,150,408 A | 9/1992 | Bright ......................... 380/21 |
| 5,164,986 A | 11/1992 | Bright ......................... 380/21 |
| 5,173,938 A | 12/1992 | Steinbrenner et al. ........ 380/21 |
| 5,208,859 A | 5/1993 | Bartucci et al. .............. 380/45 |
| 5,319,705 A | 6/1994 | Halter et al. ................... 380/4 |
| 5,375,169 A | 12/1994 | Seheidt et al. ................ 380/21 |
| 5,416,841 A | 5/1995 | Merrick ....................... 380/29 |
| 5,442,702 A | 8/1995 | van Ooijen et al. .......... 380/23 |
| 5,621,795 A | 4/1997 | Baker et al. .................. 380/21 |
| 5,642,421 A | 6/1997 | Gray et al. ................... 380/49 |
| 5,689,565 A | 11/1997 | Spies et al. ................... 380/25 |
| 5,696,825 A | 12/1997 | Johnson et al. ............... 380/25 |
| 5,710,887 A | 1/1998 | Chelliah et al. ............. 395/226 |

(List continued on next page.)

OTHER PUBLICATIONS

"CI–13 System—Automated Rekey System from the EKMS to the End CRYPTO Unit"; Motorola, Inc. Inc. website, pp. 1–2, Feb. 10, 2000.
"White Paper"; Keygen website, pp. 1–4, Mar. 17, 2000.
"Entrust/Entelligence", Entrust website, pp. 1–2, Oct. 20, 1999.

*Primary Examiner*—Gail Hayes
*Assistant Examiner*—Anthony DiLorenzo
(74) *Attorney, Agent, or Firm*—Woodcock Washburn LLP

(57) ABSTRACT

Apparatus and methods for remotely rekeying a cryptographic device are disclosed. A method according to the invention includes associating a preliminary certificate with the device, generating a device certificate associated with the device, determining whether a certificate stored in the device is the preliminary certificate associated with the device, and if the certificate stored in the device is the preliminary certificate associated with the device, then securely loading the device certificate into the device. Apparatus for remotely rekeying a cryptographic device includes a computer readable medium having stored thereon computer executable instructions for performing a method according to the invention.

9 Claims, 14 Drawing Sheets

U.S. PATENT DOCUMENTS

| | | | |
|---|---|---|---|
| 5,729,594 A | 3/1998 | Klingman | 379/93.12 |
| 5,742,682 A | 4/1998 | Baker et al. | 380/21 |
| 5,745,572 A | 4/1998 | Press | 380/21 |
| 5,745,701 A | 4/1998 | Nguyen-Thai et al. | 395/200.79 |
| 5,786,389 A | 7/1998 | O'Lenick, Jr. et al. | 514/552 |
| 5,787,172 A | 7/1998 | Arnold | 380/21 |
| 5,787,173 A | 7/1998 | Seheidt et al. | 380/21 |
| 5,790,677 A | 8/1998 | Fox et al. | 380/24 |
| 5,796,836 A | 8/1998 | Markham | 380/28 |
| 5,799,086 A | 8/1998 | Sudia | 380/23 |
| 5,809,147 A | 9/1998 | De Lange et al. | 380/28 |
| 5,812,666 A | 9/1998 | Baker et al. | 380/21 |
| 5,825,300 A * | 10/1998 | Bathrick et al. | 340/5.74 |
| 5,857,022 A | 1/1999 | Sudia | 380/23 |
| 5,870,475 A | 2/1999 | Allan et al. | 380/21 |
| 5,872,844 A | 2/1999 | Yacobi | 380/24 |
| 5,878,138 A | 3/1999 | Yacobi | 380/24 |
| 5,889,863 A | 3/1999 | Weber | 380/25 |
| 5,898,154 A | 4/1999 | Rosen | 235/379 |
| 5,970,147 A * | 10/1999 | Davis | 713/172 |

* cited by examiner

FIG. 10 Device Initialization Process

1

APPARATUS AND METHODS FOR MANAGING KEY MATERIAL IN HETEROGENEOUS CRYPTOGRAPHIC ASSETS

RELATED APPLICATIONS

This application claims priority from U.S. Provisional Patent Application Ser. No. 60/105,386, filed Oct. 23, 1998, the contents of which are hereby incorporated by reference. The subject matter disclosed herein is related to the subject matter disclosed in application Ser. No. 09/422,152, filed Oct. 21, 1999, now U.S. Pat. No. 6,212,280.

FIELD OF THE INVENTION

The present invention relates generally to cryptography systems. More particularly, the present invention relates to an automated key management system that includes apparatus and methods for managing key material in heterogeneous cryptographic assets.

BACKGROUND OF THE INVENTION

As an organization's need to provide confidentiality and authenticated access to a user's data increases, so does its need for cryptographic services. Cryptography provides a convenient way to ensure that data can be accessed (either remotely or locally) only by legitimate users with a valid "need to access," and that this data is accessed in a manner that keeps its content private to all but the legitimate accessing party. As the number of cryptographic devices used within an organization grows, the management of the key material needed to operate these devices becomes more difficult. Moreover, the organization is typically required to perform both symmetric and asymmetric key management.

An example of an organization that requires secure management of key material for a heterogeneous set of cryptographic devices is a bank. Many banking customers require secure remote access to their account balances and authenticated requests for account withdrawals. The banks themselves must be able to wire money from institution to institution in a secure and authenticated manner. Data confidentiality, data integrity, and data authenticity are obvious security requirements supporting these banking services.

Cryptography and cryptographic techniques provide a vehicle for achieving data confidentiality, data integrity, and data authenticity. As cryptography and cryptographic techniques are implemented, key management naturally follows. Traditionally, key management has tended to be a unique "stove pipe" function implemented in each cryptographic system (e.g., a wire transfer system) as a unique dedicated key management system. The key management systems (which provide point solutions) are typically proprietary and are specifically tailored to one type of cryptographic equipment from one manufacturer. Additionally, existing key management systems tend to be highly user intensive. For example, distribution of key material to automated teller machines (ATMs) typically occurs via physical channels using two person control.

Traditionally, banks have addressed the key management needs for each banking service (e.g., ATM transactions, Electronic Funds Transactions (EFTs), etc.) as a separate and distinct consideration. As banks expand their set of services, however, to include, for example, remote "home banking" and remote deployment of cash machines, each of these services will also require different key management to support the cryptography involved in implementing the service.

FIG. 1 provides an exemplary scenario in which a conventional key management system is employed in a banking network. As shown, an acquiring bank 58 is in communication with an issuing bank 50. Issuing bank 50 can be, for example, a bank in which a particular customer holds an account. Acquiring bank 58 can be, for example, a bank at which the customer initiates a transaction. For example, the customer might withdraw money from an ATM at acquiring bank 58. Acquiring bank 58 communicates the transaction to issuing bank 50 so that the banks can reconcile the transaction between them. Acquiring bank 58 and issuing bank 50 can be the same bank, or different banks.

Typically, banks communicate with one another via a financial network 54. Some well-known financial networks include Cirrus, Plus, S.W.I.F.T., etc. Financial network 54 facilitates the reconciliation of transactions between acquiring bank 58 and issuing bank 50. As shown, issuing bank 50 is in communication with financial network 54 via a public switched telephone network (PSTN) 52. Similarly, acquiring bank 58 is in communication with financial network 54 via a PSTN 56.

As shown, acquiring bank 58 can be in communication with an ATM 76, a home banking client 92, a wholesale banking terminal 64, and any number of other types of equipment. Preferably, acquiring bank 58 includes a wholesale server 60 that communicates via a PSTN 62 with wholesale banking terminal 64. Wholesale banking terminal 64 can be a computer or other workstation via which a wholesale banking operator can control electronic funds transfers (EFTs) for example. Acquiring bank 58 can also include an ATM host 72 that communicates via a PSTN 74 with ATM 76. Acquiring bank 58 can also include a home banking server 88 that interfaces via a communications network 90 with a home banking client 92. Typically, communications network 90 is the Internet, although it could be any communications network, such as a LAN, WAN, or intranet.

To maintain privacy and security on the communications network just described, cryptography is typically employed to secure the communications links. FIG. 1 shows the "disjointed" key management of each banking service when a conventional key management system is employed. That is, each banking service (ATM, EFT, home banking, etc.) makes use of a separate key management system that is dedicated to that service. The system as a whole, therefore, comprises a plurality of key management systems, each of which is separately maintained.

For example, wholesale server 60 is also in communication via a key management (KM) interface 66 with a wholesale KM system 68. Wholesale KM system 68 is in communication via a KM interface 70 with wholesale banking terminal 64. Wholesale KM system 68 manages (i.e., generates and distributes) key material for wholesale banking terminal 64. Key material can include the key itself, as well as attributes that describe the key, such as its name, version, key type, expiration date, etc.

KM interfaces 66 and 70 can be separate physical interfaces, although, in general, they need not be. KM interfaces 66 and 70 are "virtual" interfaces, i.e., they can include any vehicle by which wholesale KM system 68 can manage key material to secure the communications link between wholesale banking terminal 64 and wholesale server 60.

Similarly, ATM 76 is in communication via a KM interface 78 with an ATM KM system 80. ATM KM system 80 manages the key material for ATM 76. As shown, ATM host 72 can also interface with a network security processor (NSP) 82. NSP 82 is in communication via a KM interface 84 with an ATM host KM system 86. ATM host KM system 86 manages the key material for ATM host 72. ATM KM system 80 and ATM host KM system 86 typically share key material. Typically, ATM key management requires two person, physical delivery. That is, each of two persons is required to physically deliver part of a "split" key to ATM 76. In this way, KM interfaces 78 and 84 are not physical interfaces, but virtual.

As home banking typically occurs via the Internet, home banking server 88 is usually coupled to a secure sockets layer (SSL) accelerator 98, which provides for secure communications over a public network such as the Internet. A home banking KM system 94 communicates via a KM interface 96 with home banking server 88. Home banking KM system 94 manages the key material for home banking client 92 via KM interfaces 93, 95.

To date, the limited number of ATMs and electronic transaction interfaces has allowed the less comprehensive "point" key management systems to survive. With the explosion of remote ATMs (i.e., ATMs located in non-bank locations), the addition of numerous remote users, and the subsequent key management needs of each (i.e., each user requiring management of keying resources), the key management situation is fast becoming unmanageable. Additionally, the rapidity with which cryptographic algorithms become obsolete exacerbates the key management problem. It is well known that key management systems typically evolve from a cryptographic product; however, developers of key management systems typically develop these systems to support a particular cryptographic device. Since a single cryptographic device usually cannot support all of a user's cryptographic needs, users are frequently required to manage many different types of devices using different key management systems.

It would be advantageous, therefore, to organizations such as banks to have a comprehensive integrated key management system that efficiently and securely manages all banking key management needs (e.g., from remote ATM to remote home banking user). That is, it would be much more efficient for an organization to use a single system that can handle multiple devices, than it would be to use many different key management systems to perform the same function. Similarly, consolidation and automation in a secure framework improves the efficiency and frequency of key management activities, thus making the cryptographic systems more secure. Thus, there is a need in the art for an automated, integrated, key management system for managing key material for a plurality of heterogeneous cryptographic assets.

SUMMARY OF THE INVENTION

The present invention satisfies these needs in the art by providing apparatus and methods for remotely rekeying a cryptographic device. A method according to the invention comprises associating a preliminary certificate with the device, and generating a device certificate associated with the device, determining whether a certificate stored in the device is the preliminary certificate associated with the device, and if the certificate stored in the device is the preliminary certificate associated with the device, then securely loading the device certificate into the device.

Associating the preliminary certificate with the device can include associating the preliminary certificate with a device identifier that corresponds to the device. Determining whether the certificate stored in the device is the preliminary certificate associated with the device can include determining whether the certificate has been previously used as a preliminary certificate associated with another cryptographic device.

The device certificate can have a public part and a private part. According to this aspect of the invention, securely loading the device certificate into the device can include encrypting the private part of the device certificate using a first encryption algorithm, generating a first packet comprising the public part, the encrypted private part, and a set of decryption instructions for decrypting the encrypted private part, encrypting the first packet using a second encryption algorithm, generating a second packet comprising the encrypted first packet and a set of decryption instructions for decrypting the encrypted second packet, and delivering the second packet to the device.

The inventive method can also include loading the preliminary certificate into the device. The preliminary certificate can be loaded into the device via a preliminary certificate loader.

Apparatus for remotely rekeying a cryptographic device can include a computer readable medium having stored thereon computer executable instructions for performing a method according to the invention. The apparatus can also include a preliminary certificate loader that receives the preliminary certificate from the computer readable medium, and delivers the preliminary certificate to the device.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific apparatus and methods disclosed.

FIGS. 4A–4D provide a workflow diagram for a key management system according to the present invention.

DETAILED DESCRIPTION OF PREFERRED EMBODIMENTS

Overview

Figure 2:
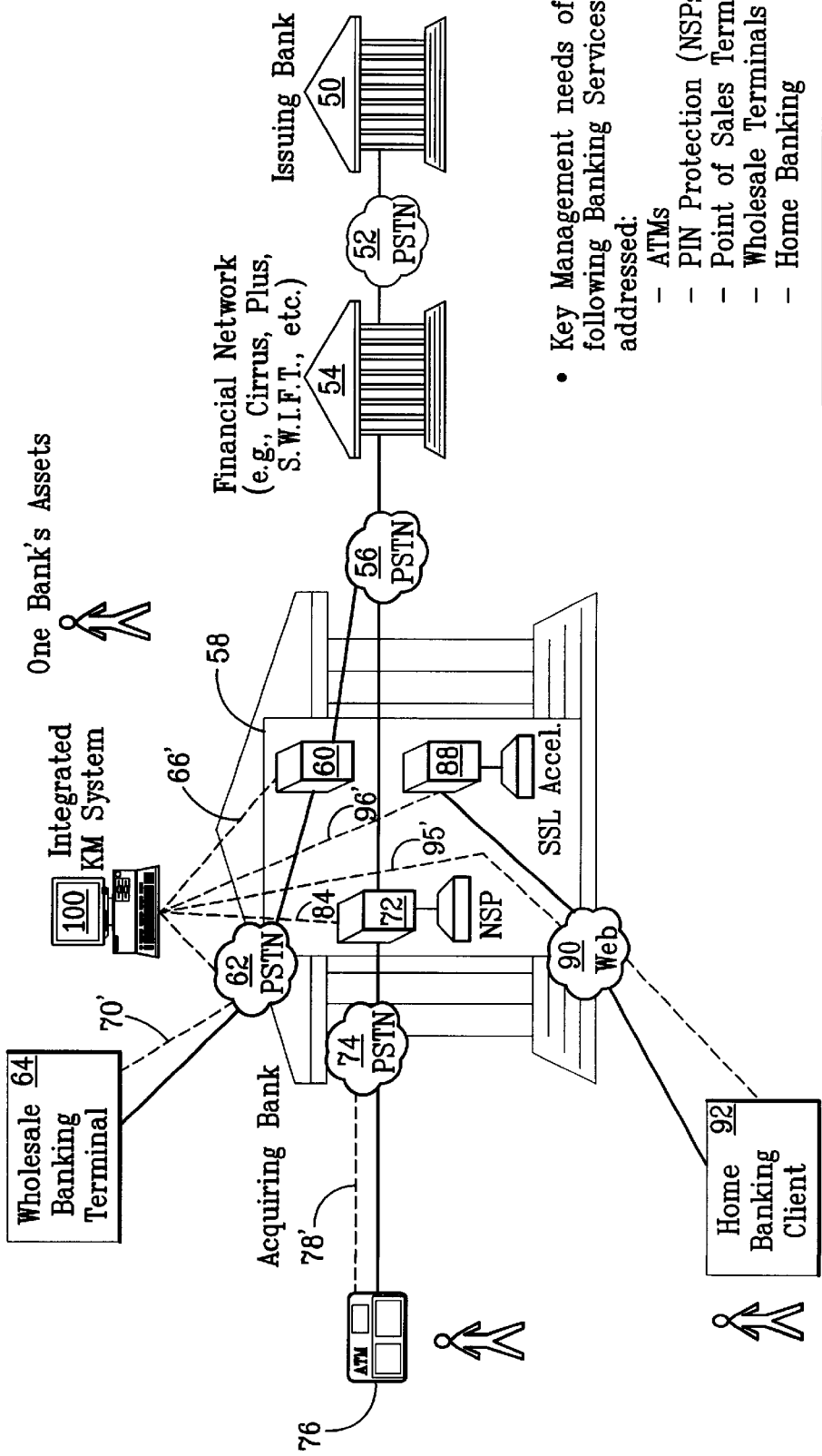
FIG. 2 provides an exemplary scenario in which a key management system according to the present invention is employed.

FIG. 2 provides an exemplary scenario in which an integrated key management system (IKMS) according to the present invention is employed. FIG. 2 depicts an IKMS 100 supporting a plurality of banking services that employ heterogeneous cryptographic assets. It should be understood, however, that the use of a bank is merely exemplary, and that the apparatus and methods of the present invention can be employed by any organization that manages cryptographic equipment.

As discussed above in connection with FIG. 1, an acquiring bank 58 is in communication with an issuing bank 50 via a financial network 54. Acquiring bank 58 and issuing bank 50 can be the same bank, or different banks. Preferably, issuing bank 50 is in communication with financial network 54 via a public switched telephone network (PSTN) 52. Similarly, acquiring bank 58 is in communication with financial network 54 via a PSTN 56. It should be understood, however, that PSTNs are exemplary, and that any public or private communications network can be used.

As shown, acquiring bank 58 can be in communication with an ATM 76, a home banking client 92, a wholesale banking terminal 64, and any number of other types of equipment. Preferably, acquiring bank 58 includes a wholesale server 60 that communicates via a PSTN 62 with wholesale banking terminal 64. Acquiring bank 58 can also include an ATM host 72 that communicates via a PSTN 74 with ATM 76, and a home banking server 88 that interfaces via a communications network 90 with a home banking client 92. Preferably, communications network 90 is the Internet, although it can be any communications network such as a LAN, WAN, or intranet.

Figure 1:
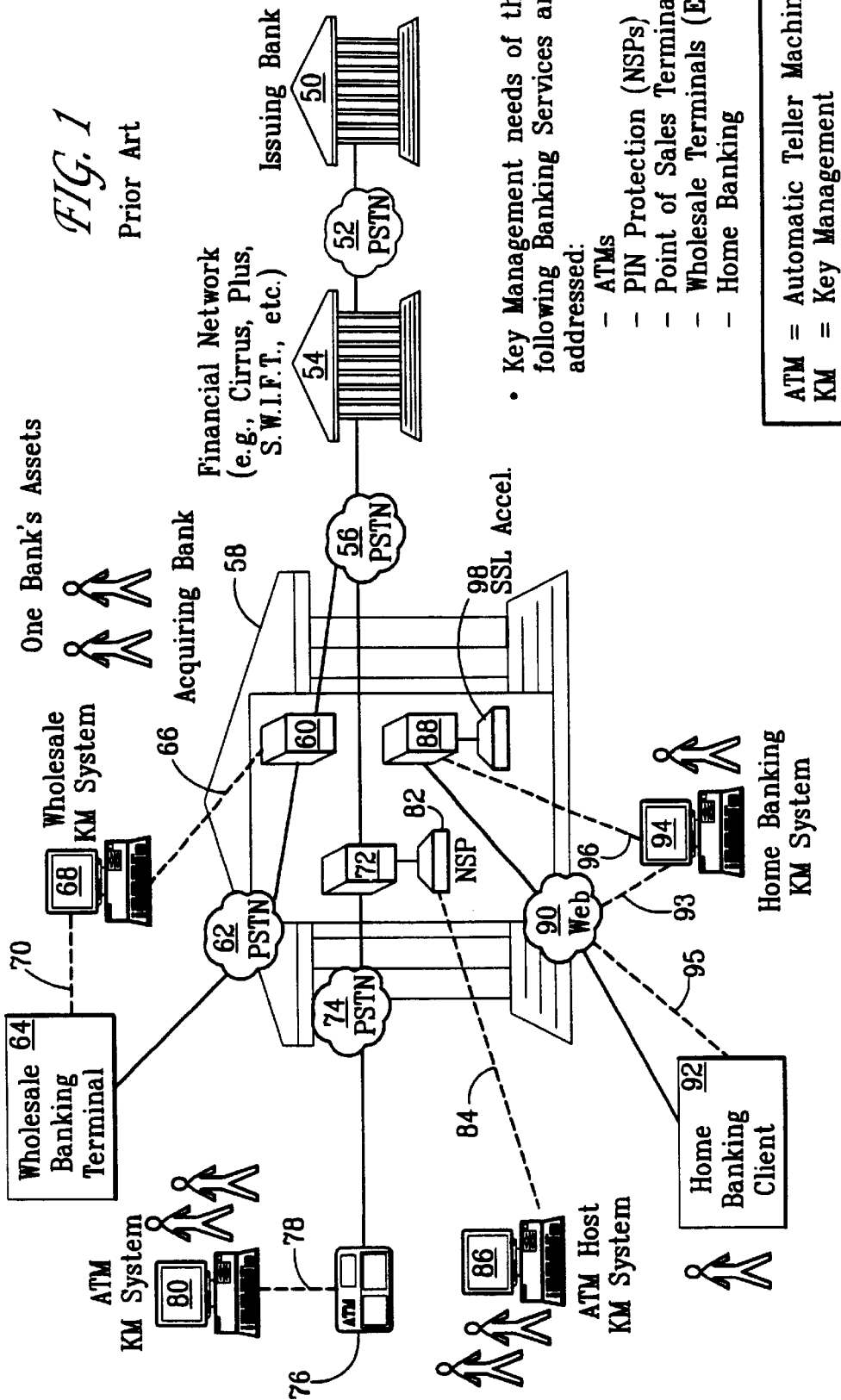
FIG. 1 provides an exemplary scenario in which a conventional key management system is employed.

In contradistinction to the scenario of FIG. 1, FIG. 2 shows the "integrated" key management of a plurality of banking services when a key management system according to the present invention is employed. That is, each banking service (ATM, EFT, home banking, etc.) makes use of the same key management system that manages key material for all the banking services. Thus, there is no longer a need to maintain a separate key management system for each banking service.

For example, as shown in FIG. 2, IKMS 100 is in communication with wholesale server 60 via a KM interface 66' and with wholesale banking terminal 64 via a KM interface 70'. Similarly, IKMS 100 is in communication with home banking server 88 via a KM interface 96', and with home banking client 92 via a KM interface 95' over communications network 90. Finally, IKMS 100 is also in communication with ATM server 72 via a KM interface 84', and with ATM 76 via a KM interface 78'. Thus, a single IKMS is in communication with a plurality of equipment types, each of which requires, in general, different key management.

For example, as described above, ATMs typically require two-person physical delivery of split key material, and employ symmetric cryptographic algorithms. Home banking systems, on the other hand, typically manage key material over the Internet and employ asymmetric algorithms. Thus, the plurality of cryptographic assets that IKMS 100 manages can be said to be heterogeneous. That is, in general, they require different key material and employ different cryptographic algorithms.

An integrated key management system according to the present invention provides a number of benefits. For example, it can support key generation and key distribution for numerous types of equipment and for both symmetric and asymmetric algorithms. An "asymmetric" key algorithm involves two separate keys (e.g., one key to encrypt and another to decrypt) that are based on a mathematical relationship in which one key cannot be calculated (at least in any reasonable amount of time) from the other key. In a "symmetric" algorithm, the encryption key and the decryption key are typically the same.

By automating the management of key material, the IKMS can reduce operating and maintenance costs associated with supporting multiple, "point" key management systems. The IKMS can also save time because there is no longer a need to have an operator intervene at every step of the process. The IKMS can provide secure storage of key material for a plurality of cryptographic assets, and thus, can allow for key recovery during disasters, equipment failure, law enforcement action, etc. It can support secure, automated distribution of keys to equipment on a scheduled basis, and rapid redistribution of previously distributed key material to restore secure communications services. It can support secure key distribution to remote cryptographic equipment over both public and private communications networks. Examples of public communications networks include public switch telephone network (PSTNs), or the Internet. Examples of private communications networks include local area networks (LANs) or leased lines. Typically, leased lines are part of the PSTN.

The IKMS can integrate multiple cryptographic activities in a single workstation or network, and can support future growth of key management capabilities, such as distribution methods and additional algorithm types, without adding new support systems.

Generally, the present invention focuses on the automated management of key material across an organization with a diverse (i.e., heterogeneous) set of cryptographic assets. The IKMS can simplify the key management process, while supporting the secure management of key material, for a plurality of heterogeneous cryptographic devices. It can manage key material for a variety of equipment types, and for a variety of algorithms, over the entire life cycle of the key material (i.e., from generation to destruction).

A preferred embodiment of the present invention includes both hardware and software components. It can include a server or computer that runs an operating system, a relational database, and key management application software. Cryptographic functionality can be implemented in a cryptographic module, which can be implemented in hardware or software. This cryptographic functionality can include the generation, encryption, decryption, randomization, and translation of key material (both symmetric and asymmetric) and of key distribution messages. A preferred embodiment of the present invention includes a hardware cryptographic module. An IKMS server and IKMS application software provide control for the cryptographic hardware module.

The IKMS can operate as a single system, or it can interact with similar systems to form a key management network. In this way, key material can be moved securely between systems to support backup operations and to distribute management responsibilities. This architecture can support a variety of network organizations that include, for example, centralized generation and distribution, centralized generation with distributed distribution, and distributed generation and distribution. Key material can be encrypted and sent from one system to another via e-mail. Preferably, the key material is encrypted along with the message body containing the encrypted key data. This ensures confidentiality of the key management messages passed between systems.

An IKMS according to the present invention can provide secure remote rekey of cryptographic devices connected via public or private networks. The implementation of this remote rekey capability can simplify the key management of cryptographic devices that are remote from the key management center. Many cryptographic devices require physical two-person delivery of key material (i.e., where two people are required to ensure that the secret key is, in fact, secret). Remote rekey can eliminate the need for anyone to visit the equipment during the keying process. The key can be delivered securely over a network in a manner that ensures that the secret key is not compromised.

Thus, the apparatus and methods of the present invention allow one or more users to generate, distribute, and manage cryptographic key materials for heterogeneous cryptographic assets within an organization, from a single or networked group of workstations or computers. Notably, the system can provide life cycle key management for each cryptographic asset it manages. Preferably, these life cycle management activities span the entire life of the key material (i.e., from generation to destruction), and can include, for example, registration of accounts (i.e., the network of computers managing the key material), registration of system operators, registration of equipment to receive the key material, registration of equipment types, and registration of keying services (e.g., the cryptographic link between two or more pieces of equipment).

The system can also manage automated scheduling of key generation, distribution, and replacement, and the generation of key material for a variety of encryption algorithms (e.g., Data Encryption Standard (DES), triple DES, Rivest-Shamir-Adleman (RSA), DSA, Diffie Hellman, etc.). IKMS can import keys from "foreign" generation systems, and audit security critical events (such as distribution of key and creation of key). The system can generate reports, such as key holdings, registered configuration of cryptographic networks, equipment holdings, etc. It can manage secure distribution of key material, automated destruction of key material upon expiration/replacement, supersession of key material, secure remote rekey of equipment over open networks, and so on.

Thus, the apparatus and methods of the present invention can help an organization improve its system's security, while adapting to the organization's unique security policies. A preferred embodiment of the present invention includes a software management system, and a commercially available hardware cryptographic engine. The software management system manages and tracks life cycle activities, and directs the activities of the hardware cryptographic engine. The cryptographic engine performs encryption, decryption, and signature functions.

Significant features of this system include its ability to securely generate and store key material for a variety of equipment and algorithm types. It is anticipated that the system should be able to manage numerous types of cryptographic equipment from numerous manufacturers and, preferably, it has a built-in ability to expand the suite of equipment it can manage. The system has the ability to automate the key generation and distribution processes based on information recorded in its database about the equipment and its connectivity. It can handle system failures by providing secure recovery methods for securely stored key material. It can securely archive key material to support key recovery. It can manage both symmetric and asymmetric key material and equipment using either or both of these types of key. It can manage key material over its entire life (i.e., from generation to destruction), and it can support secure remote rekey over open (i.e., public) networks. It controls cryptographic assets through a unique database-driven operator interface that is simple and straightforward to use. It can import key material from other systems for secure storage and secure distribution to equipment registered with this system.

Apparatus and Methods for Managing Key Material in Heterogeneous Cryptographic Assets This section describes a preferred embodiment of the apparatus and methods of the present invention. Generally, the services that IKMS provides include accounting, registration (accounts, equipment type, equipment, and cryptographic equipment relationships), key generation, automated and manual secure key distribution, remote rekey, key import, key supersession, report generation, key management auditing, system maintenance, cryptographic support, secure key material storage, and messaging.

Figure 3:
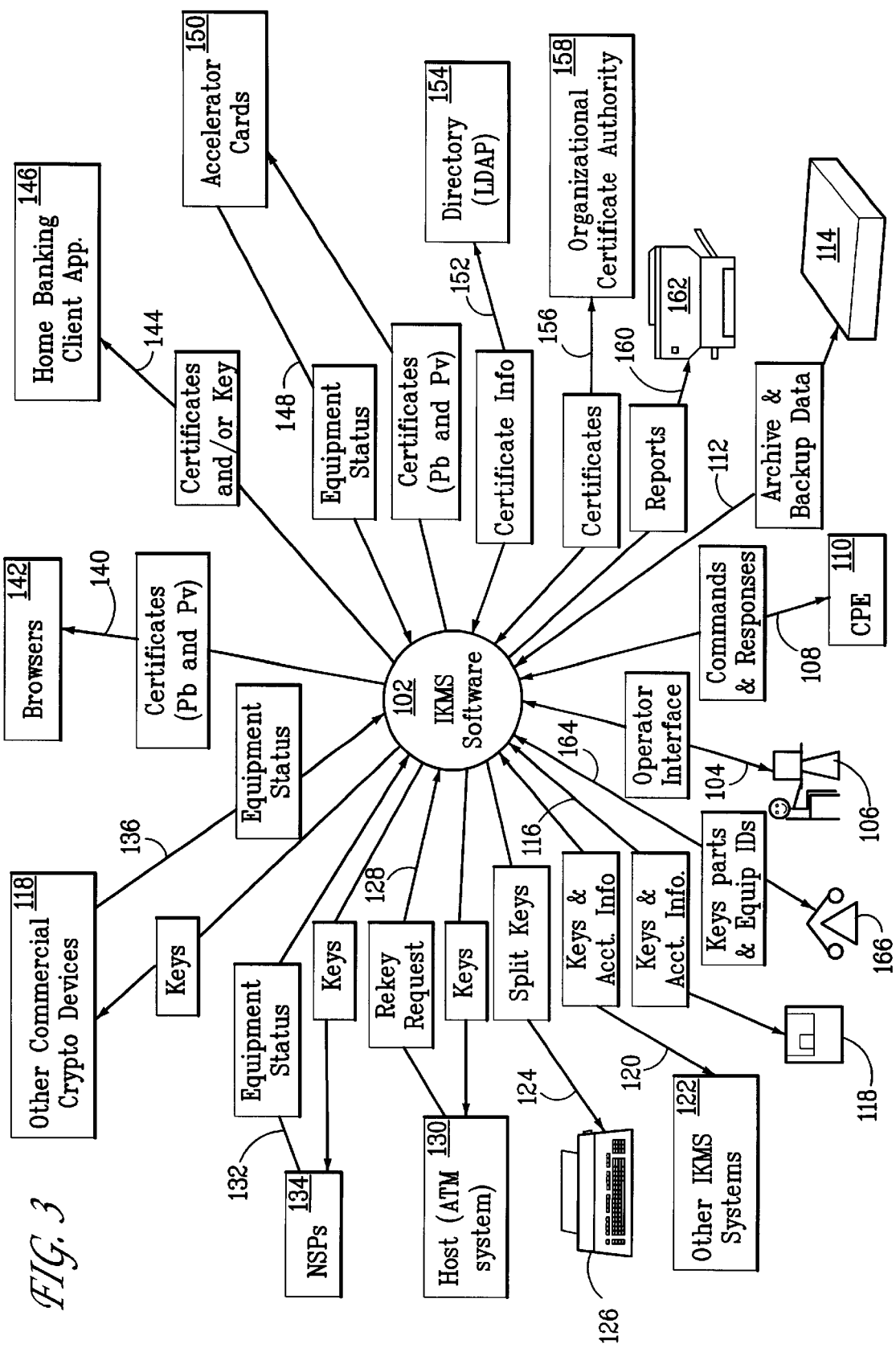
FIG. 3 is a software context diagram for a key management system according to the present invention.

FIG. 3 is a software context diagram for an integrated key management system (IKMS) 100 according to the present invention. As shown in FIG. 3, IKMS 100 can support a plurality of interfaces. For example, an operator interface 104 is used to enable the system (e.g., via operating system log-on and two user application log-on), to configure the system, to direct activities, and to establish automated schedules. Once the system is enabled, automated activities can occur through other interfaces. Preferably, the system can support three types of operators 106: operating system administrators, database administrators, and IKMS specialists (i.e., operators of the IKMS application). Preferably, IKMS requires two IKMS specialists to be logged on simultaneously, although other log-on mechanisms can be implemented depending on the needs of the individual implementation. For example, token access might be employed.

A "Cryptographic Processor Engine (CPE)" interface 108 supports cryptographic processing. CPE 110 can perform key generation, random number generation, encryption, decryption, translation, and signing. IKMS application software 102 manages CPE 110 and directs its action. CPE 110 enhances security by isolating cryptographic functions to a protected boundary and by accelerating cryptographic processes. The CPE function can be implemented as a hardware or software module. It is anticipated that a preferred embodiment will utilize a hardware module that interfaces through a PCI bus 108. One or more modules (or cards) can be used to provide the CPE function.

A "Floppy Disk" interface 116 supports distribution of cryptographic material (keys and certificates) to commercial cryptographic equipment and other IKMS systems via a floppy disk or other removable data storage medium 118. Normally, floppy disk interface 116 is used as a backup distribution interface.

An "Other IKMS Systems" interface 120 can be used to distribute key material, IKMS certificates, reports, and distribution confirmation messages between IKMS accounts (i.e., other IKMS systems 122). Interface 120 can be supported through e-mail, with the actual data being transmitted via an attachment. Interface 120 is also used to backup critical IKMS data between one IKMS account and its backup IKMS account. Data backup is typically supported by TCP/IP with the data link between the two accounts protected by encryption to ensure data privacy.

An "Impact Printer" interface 124 supports symmetric key distribution to cryptographic devices requiring physical delivery of key material (such as ATMs, financial switches, and NSPS). Physical keys are split, and each split is printed on a separate PIN mailer form using printer 126. The split keys are sent to two different people for manual entry into the cryptographic device. Interface 124 can also be used to print key parts that can later be associated to form a key in the field.

An "ATM System" interface 128 is used to rekey an ATM 130 over the network using a remote rekey process. Whenever a request for rekey is received from an ATM Host, the requests can be validated and then processed automatically—without operator intervention. A Diffie-Hellman key exchange can be used to generate two unique session KEKs for the rekey exchange. A KEK (key encryption key) is a key used to protect another key. The new key (to be sent to the ATM) is encrypted in the KEK. The whole message is then encrypted in the second unique session key (to provide data privacy), and sent to the ATM Host system.

A "Network Security Processor (NSP)" interface 132 can be used to rekey an NSP 134 over a network using the "Remote Rekey" process defined above for ATM System interface 128. NSP 134 can also be keyed manually using impact printer interface 124. NSP interface 132 can be used to obtain the cryptographic status of NSP 134 in support of network management.

An "Other Commercial Crypto Devices" interface 136 represents a modular system structure (e.g., an application program interface (API)) that allows new device interfaces to be defined at a later date and installed into the system without having to re-compile IKMS software 102. It is anticipated that new equipment types will be added as the system matures. Interface 136 can also be used to obtain the cryptographic status of the "other" commercial cryptographic devices 138, such as a link encryptor, in support of network management.

A "Browser" interface 140 can provide an access interface for home banking clients. It is known that emerging home banking systems tend to use the Internet to provide a communications channel between a home banking client (e.g., a customer) and a home banking server (e.g., the bank). Browser interface 140 can support transaction privacy through the use of an SSL. Preferably, browser interface 140 supports the loading of certificates into browsers 142 that are owned by home banking customers. "NETSCAPE COMMUNICATOR" and "MICROSOFT INTERNET EXPLORER" browsers are supported in a preferred embodiment.

A "Home Banking Client Application" interface 144 supports keying needs of home banking clients 146 that utilize non-browser interfaces. Several existing products support dial-up connections, use cryptography to protect the privacy of the interaction, and employ a user ID/password access mechanism. Interface 144 supports the initial distribution of key material to support the cryptographic functions within these products.

An "Accelerator Card" interface 148 supports the distribution of public/private key pairs to accelerator cards 150 residing in a home banking server farm, for example. Emerging home banking systems are known to be implementing cryptographic acceleration in order to support client privacy rights. It is expected that this will require the use of multiple accelerator cards 150 within a server farm. These cards must be configured with the same public and private components so that a client can operate with the first available server. Interface 148 can also be used to obtain the cryptographic status of accelerator cards 150 in support of network management.

A "Directory" interface 152 is a network interface that supports the directory access protocol (DAP) or lightweight DAP (LDAP). Interface 152 allows an IKMS public key management module (which is part of the IKMS software) to provide certificate information to a directory 154 when new certificates are created, modified, renewed, or deleted. Directory interface 152 can also support query functions to view contents of directory 154.

An "Organizational Certificate Authority" interface 156 allows the IKMS to interoperate with an existing organization's certificate authority 158. The certificate authority is authorized by the organization to create and sign certificates. Interface 156 can provide a common entry point for an organization's key management functions. Preferably, operator 106 can use the IKMS to navigate to the organization's certificate authority 158. IKMS can also manage when a certificate should be renewed by sending a message to certificate authority 158 via interface 156 to instruct it to renew the certificate.

A "printer" interface 160 supports printing of system reports at a printer 162.

A "tape archive" interface 112 supports system backup and archive of expired key material. Typically, key material has a "life expectancy," i.e., it is used for only a limited duration. Preferably, operator 106 establishes a backup policy to minimize the effects of system crashes or other disasters. For example, the entire IKMS software image can be stored to tape 114 to minimize recovery time. Also, since key and certificate material expire periodically, it is desirable to archive this material in a secure form so that it can be recovered at a later time if necessary.

A "telephone" interface 164 allows the IKMS to accept direction from an authorized user via a telephone 166 for the purpose of identifying an equipment to be keyed from key parts. The telephone user identifies the equipment and key parts to be used in that equipment through a series of voice prompts and associated numeric responses via the telephone key pad.

IKMS utilizes a unique work flow wherein key material can be managed based on its association with a particular secure communications link (i.e., a cryptographic link). Typically, key material has a one-to-one association with a cryptographic link, although two or more cryptographic devices can participate on a single cryptographic link. The system can also support the ability to manage key material based on the equipment. Both types of management are desirable during the life cycle management of key material. For example, when setting up a cryptographic network for the first time, the cryptographic link view might be most important. The network planner often wants to define a cryptographic link, and then assign equipment to that link. Once the link has been established, it may be necessary to replace a piece of equipment in the link. In this case, it is often better to view the management activities from the viewpoint of the equipment. In some instances, a cryptographic device can participate in multiple cryptographic links. For example, an ATM Host typically communicates with a plurality of ATMs. By viewing the management process at the equipment level, key material associated with a plurality of cryptographic links can be replaced with one operator action.

Figure 4A:
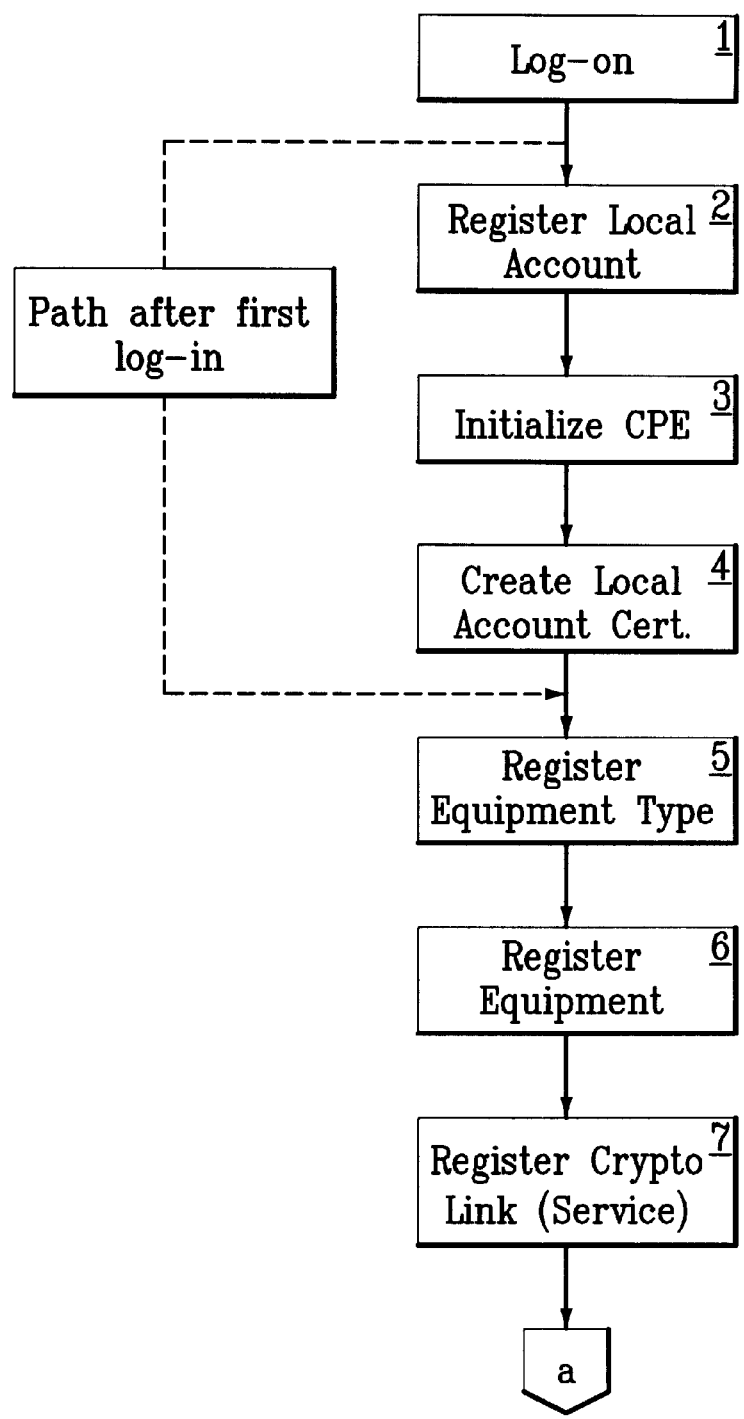

FIGS. 4A–4D provide a workflow diagram for a key management system according to the present invention. FIG. 4A depicts the workflow necessary to initialize a system of cryptographic equipment and manage keys associated with that equipment. This workflow method allows an operator to manage the keys associated with the registered equipment and cryptographic links through multiple views (from an equipment view or from a cryptographic link view). The ability to manage key material from multiple views is a unique advantage of the present invention.

The workflow begins at step 1 when two legitimate operators log on to the system. A "legitimate" operator is an operator that is registered and authorized by the organization. It is preferred that two operators are required to log on to ensure that no single individual has access to keying services or physical key material. If the IKMS has not been configured, the operator can first register the local account at step 2. Registration of the local account can include assigning the account a name, an ID, a point-of-contact (e.g., address, phone number, e-mail address), an account status (e.g., available, not available), an account type (e.g., remote, local), and account capabilities (e.g., backup account, certificate authority account, signer account). The operator initializes a cryptographic processor engine (CPE) at step 3, and then loads an initialization key into the CPE.

Once the local account is registered and the CPE is initialized, the system can create a public/private key pair, at step 4, that can be used to transmit messages between IKMS accounts securely. Preferably, if the account is a "signer" account, then the public key pair is self-signed. If it is a "non-signer" account, then the public key is sent to the signer account (e.g., when it is registered) for signing. Once signed, the signed data is returned, verified, and stored by the account. This ensures that all certificates used in a network of IKMS' can be authenticated based on a master root certificate held at the "signer" IKMS account.

Preferably, the IKMS implements an archive service that establishes how generated and imported key material is archived securely for later retrieval by authorized personnel. Also, IKMS preferably supports a key printer located on a local port. The port could be registered by the operator or defaulted by the IKMS software. Preferably, the key printer is an impact printer that is used to print key components on PIN mailers. Preferably, for security reasons, the key printer should be managed locally rather than being networked.

Other accounts can be registered at step 19 (see FIG. 4C). This process is similar to the registration of the local account. Preferably, all accounts with which the local account will communicate are registered. For security reasons, messages associated with key management are not sent to non-registered accounts.

Equipment types can be registered at step 5. This process defines the common attributes of a type of equipment. For example, attributes such as the name, manufacturer, and model number can be defined. Similarly, the number of cryptographic links of which the equipment can simultaneously be a part, type of unique key (i.e., a key that is unique to a particular equipment), cryptoperiod of the unique key, type of algorithms supported, type of initial key(s) (i.e., key shared between equipments that is used to start up communications processing), and type of periodic net key (i.e., operational key shared between equipments, typically replaces initial key during operations) can be defined. The allowable distribution method for the unique key, the initial key(s), and the net key(s) can also be defined. These attributes describe the type of equipment and are registered once. This helps to simplify the subsequent registration of instances of this type, and requires that the complicated aspects of the equipment be registered only once.

Once equipment types have been registered, specific instances of an equipment type can be registered at step 6. For each equipment instance, a serial number is entered, a net algorithm is selected, and specific distribution methods for the unique key, initial key(s), and the net key(s) are selected.

Finally, an association between equipment and the cryptographic link is made at step 7 by "registering a service." Here, the name of the secure communications service is entered (and validated for uniqueness), and an "in-service date" is selected (i.e., a date on which the service is to begin). Equipment instances are then selected from the set of registered equipment. Upon selection of the first equipment, only equipment with compatible registered algorithm types may be selected. For each selected equipment, the operator must specify the source of each registered key type (unique, initial, and net). The source can be "generated" (by IKMS), it can be "imported" from another system, or it can come from key components. The cryptoperiod for each key is also defined. This determines how long the key should be used and triggers an automated rekey process when the cryptoperiod expires. Completion of the process defined in FIG. 4A configures the system and establishes cryptographic link services.

The operator can now use the process defined in FIGS. 4B–4C to maintain the system. An "Import Key" function 11 can be used to associate key material from a "foreign" key management system with a cryptographic link (service) defined in IKMS. The key is brought into the system, associated with a service, and stored securely in the IKMS database. A version number of the key is assigned during its import, as is its effective date.

A "Send Key" function 12 can be used to support recovery of service. An operator can decide to resend a key to an existing service, equipment, or account. This function allows an operator to recover from failures. For example, if an equipment fails it may lose its key. Once the equipment is repaired, it may be necessary to re-install the "old" keys. This can be accomplished by using the "Send Key" function.

A "Reconcile Key" function 13 can be used to validate that a key sent to another account was received by that account. This validation occurs by reconciling the receipt sent from the receiving account to the sending account with the internal accounting records at the sending account. Typically reconciliation occurs automatically. However, it may be necessary to perform the reconciliation manually to account for e-mail failures.

"Send and Receive Mail" functions 26 allow an IKMS operator to view and send mail. This allows the operator to communicate with other IKMS accounts or other e-mail locations to coordinate activities associated with key management. An example would be to trace a key sent from one account to another that had not been reconciled within the expected period of time. An e-mail could be sent to the account asking if the key had been received.

A "Remove Key" function 17 allows the operator to coordinate the archive of key that has expired or been superceded. This key is encrypted in an archive key and stored for a period, preferably of up to 10 years. The key can be recovered using the "Restore Key" function 17. The restore function brings in an archive record, and translates the key for distribution to an an equipment such as an "analysis station" (i. e., a processor that accepts the key and, therefrom, decrypts one or more particular transactions (e.g., for law enforcement purposes)). In this way, the key is delivered securely to the "analysis station".

An "Add/Modify/Delete Account" function 19 allows the operator to add new IKMS accounts, delete accounts no longer needed, or modify attributes of existing accounts.

An "Add/Modify/Delete Equipment Type" function 20 allows the operator to add new equipment types, delete equipment types that have no assigned instances of equipment, or modify attributes associated with existing equipment types.

An "Add/Modify/Delete Equipment" function 22 allows the operator to add new equipment instances, delete equipment instances that are not currently assigned to a service, or modify attributes associated with an equipment instance.

An "Add/Modify/Delete Service" function 23 allows the operator to define new services (i.e., cryptographic link associations), delete existing services, or modify attributes associated with existing services.

A "Supercede Key" function 21 allows the operator to select a service (cryptographic link association) and specify that a superceding version of the key should be sent to all equipment associated with that service. This function can be used to combat a current or potential compromise by advancing to a new key for the network.

A "Changeover CPE" function 24 is used to translate the encrypted key database from the current storage (or protection) key to a new storage key. Preferably, the key material has a finite useful life—including keys used to protect other keys. This function allows the operator to change this storage key.

A "Init/Restore CPE" function 25 allows an operator to recover from CPE equipment failure. This function supports the replacement of the failed equipment and then subsequently allows the initialization key material to be reloaded into the new CPE hardware. This allows the user to recover the encrypted key database in a secure manner.

A "View Scheduler" function 27 provides information that gives the operator an overall sense of the status of the system. This function provides an indication of the current processing load, alerts about required operator actions, and notices of system or equipment failures.

A "View Key Inventory" function 28 allows the operator to view the current key material inventory held by the IKMS account. Preferably, the operator can view or print this inventory.

A "View Equipment Inventory" function 29 allows the operator to view the current equipment registered with this account. Preferably, the operator can view or print the equipment inventory.

A "View Distribution Summary" function 30 allows the operator to view the status of all key distributions of key material held in inventory. The date of delivery, the operators logged on when the delivery occurred, the version and name of the key delivered, and the recipient of the delivery are listed by this function. The operator can view or print the distribution summary.

A "View Node Connectivity" function 34 allows the operator to view the connectivity of the equipment defined in the Register Service function (FIG. 4A at step 7). The equipment instances are organized by service name and key version number. Preferably, the operator can view or print the node connectivity.

A "View CPE Status" function 33 allows the operator to view the status of the CPE card. The card's firmware image id, card state, card serial number, status of loaded application keys, status of archive key check, and the status of a cryptographic check are displayed.

A "View Errors" function 15 allows the operator to view details regarding any errors encountered during IKMS processing. This allows the operator to identify problems and correct them promptly.

A "View Suspended Jobs" function 16 allows the operator to view any scheduled IKMS function (such as a key generation or key distribution) which has been suspended due to a lack of information or unavailability of the device. Once the information is available or the device becomes available, the suspended job is retried.

A "View Equipment Out of Service" function 31 allows the operator to view any equipment that is not communicating properly with IKMS. If communications to an equipment fails, the equipment is placed on this list and subsequent distributions to that equipment are suspended. This prevents sending unnecessary messages to an equipment that is known to be non-functional. Once the equipment is made functional, the equipment is removed from the list and distributions will resume.

A "Test Print" function 32 allows the operator to temporarily suspend jobs in the print queue to load new PIN mailer forms on the printer. This function allows the operator to print a test pattern on the form to ensure that it is properly aligned. Once the form is aligned, the Test Print function 32 is cancelled and printing to the key printer resumes.

An "Archive Report 18 function allows the operator to view and print a report on all key material that has been archived.

"Request Send Components" and "Request Associate Components" functions 14 are provided to support the distribution of additional key parts (components) to a key custodian and to support the association of selected key parts to form keys in end cryptographic devices. A key custodian will load key parts into an equipment and then call back to IKMS where the IKMS operator will use the "Request Associate Components" function 14 to select the identified key parts. These key parts are then combined by IKMS into a key that is distributed to all the other equipment related to the equipment being physically loaded (from the key parts) by the key custodian.

Figure 5:
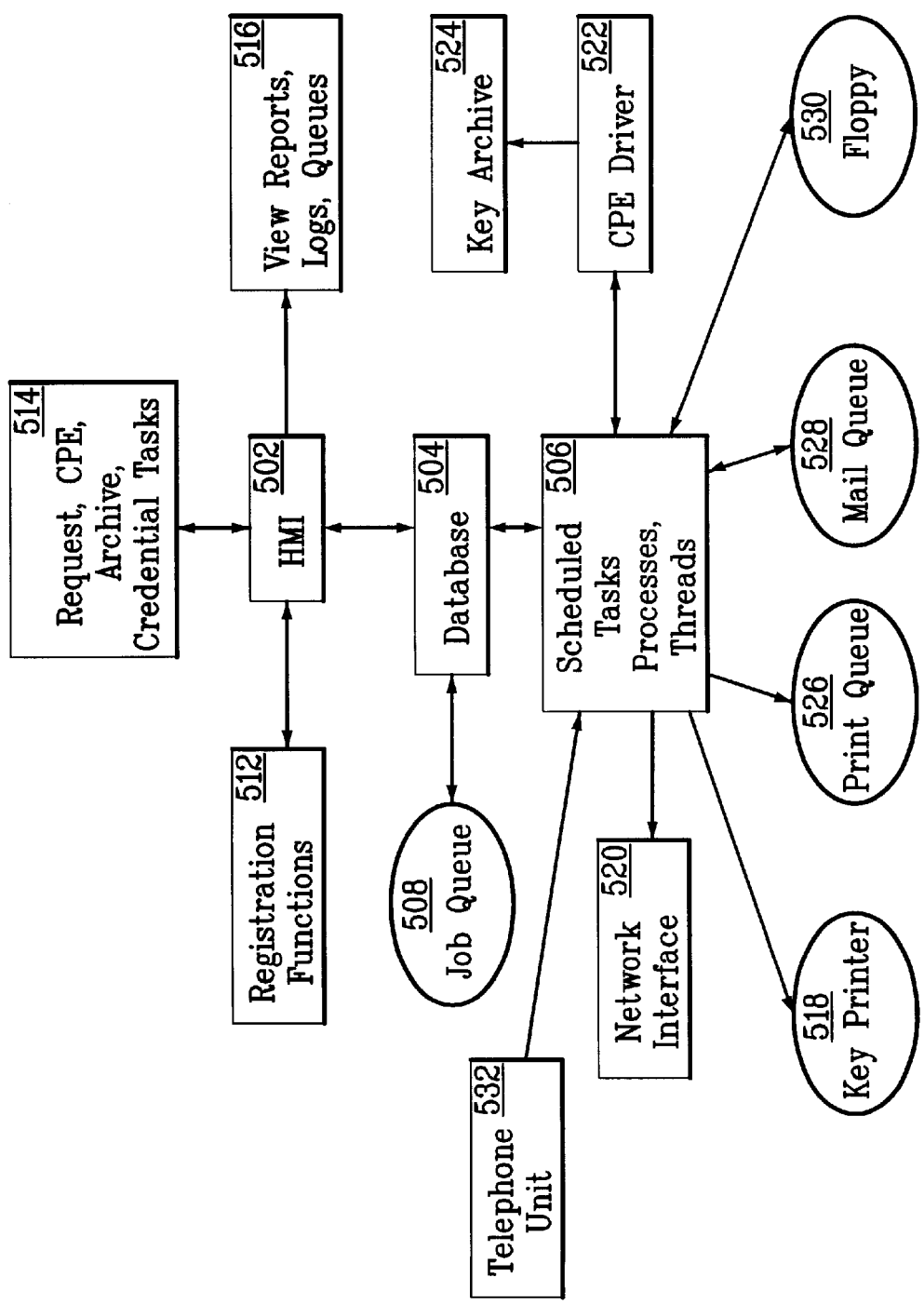
FIG. 5 depicts a software architecture for a preferred embodiment of the present invention.

FIG. 5 shows the functional organization of a software architecture for a preferred embodiment of the present invention. The main software units are a database 504, human machine interface (HMI) 502, and a background module 506 that handles all of the HMI-requested and scheduled tasks. Preferably, database 504 is an "ORACLE" database and the preferred software implementation includes Microsoft's Visual C++ (or any C++ development) and the Oracle PL/SQL language.

Database 504 stores all of the IKMS's data. This is a relational database that contains the schema for the IKMS application. The database schema has tables that are used to store the following information: operator-entered information, IKMS generated data that must remain in the system, data that needs to be passed between program units, initialization parameters, options on various windows that are selectable by the operator, look-up tables that are used to translate enumerated values into character strings that are readable by the operator, and jobs that must be processed by the IKMS. The jobs that are processed by the IKMS are HMI-entered requests and periodic tasks based on scheduled events. The HMI-entered tasks have a higher priority and will be fetched for execution prior to scheduled tasks. IKMS uses an "ORACLE" internal job queue 508 that allows tasks to be executed on a periodic basis defined by the application. Primary access to database 504 by the application is through an open database connectivity (ODBC) interface in the C++ environment that invokes PL/SQL stored procedures.

HMI 502 handles the operator interface. That is, HMI 502 allows the operator to view/enter IKMS information. HMI 502 also has an interface to database 504 for storage and retrieval. Any information displayed to the operator is fetched from database 504 and any persistent information or tasks requested by the operator are stored in database 504. HMI 502 has several functional areas as follows: registration functions 512 to record application data, request functions 514 that cause data to be sent, received or deleted from the system, cryptographic initialization and maintenance functions 514, views that display scheduled tasks 516, item inventory and status 516, and report generation 516.

Background task 506 handles jobs entered via HMI 502, and jobs that must be processed on a periodic basis. Background task 506 fetches jobs from a set of tables in database 504. HMI-entered jobs have the highest priority. These will be fetched first from queue 508. Other tasks are scheduled on a periodic basis. The jobs that background task 506 performs include the generation of keys, printing keys to a key PIN printer 518, distributing keys over a network 520, interfacing to a CPE device 522, creating archive files for each key generated and auditing the appropriate information 524. Background task 506 performs most of the interface functions to CPE device 522, key PIN printer 518, and network 520. Reports are sent to a print queue 526 for printing on a report printer. Key material can be exchanged securely with other IKMS systems through a mail queue 528. A floppy interface 530 is used to distribute key material and other initialization data to local devices.

Telephone Unit module 532 performs three main tasks: provides telephone prompts, accepts input from the telephone, and sends messages to Background Task 506. Telephone Unit module 532 is used to allow an authorized user to remotely inform IKMS which key parts (components) should be used with a particular equipment. The user is prompted by Telephone Unit module 532 to identify the equipment to be keyed and to identify the key parts to be used in the equipment. Once this information is determined, Telephone Unit module 532 sends a message to Background Task 506 to immediately schedule the association of the identified key parts and the subsequent distribution of the resultant key to all other equipment related to the identified equipment. For example, if an ATM is identified through this process, and key parts 1 and 2 are identified as the key parts for the ATM's AATM key, then the IKMS will build the ATM's AATM key from the identified key parts, and then distribute AATM to the ATM Host associated with the ATM.

Figure 6:
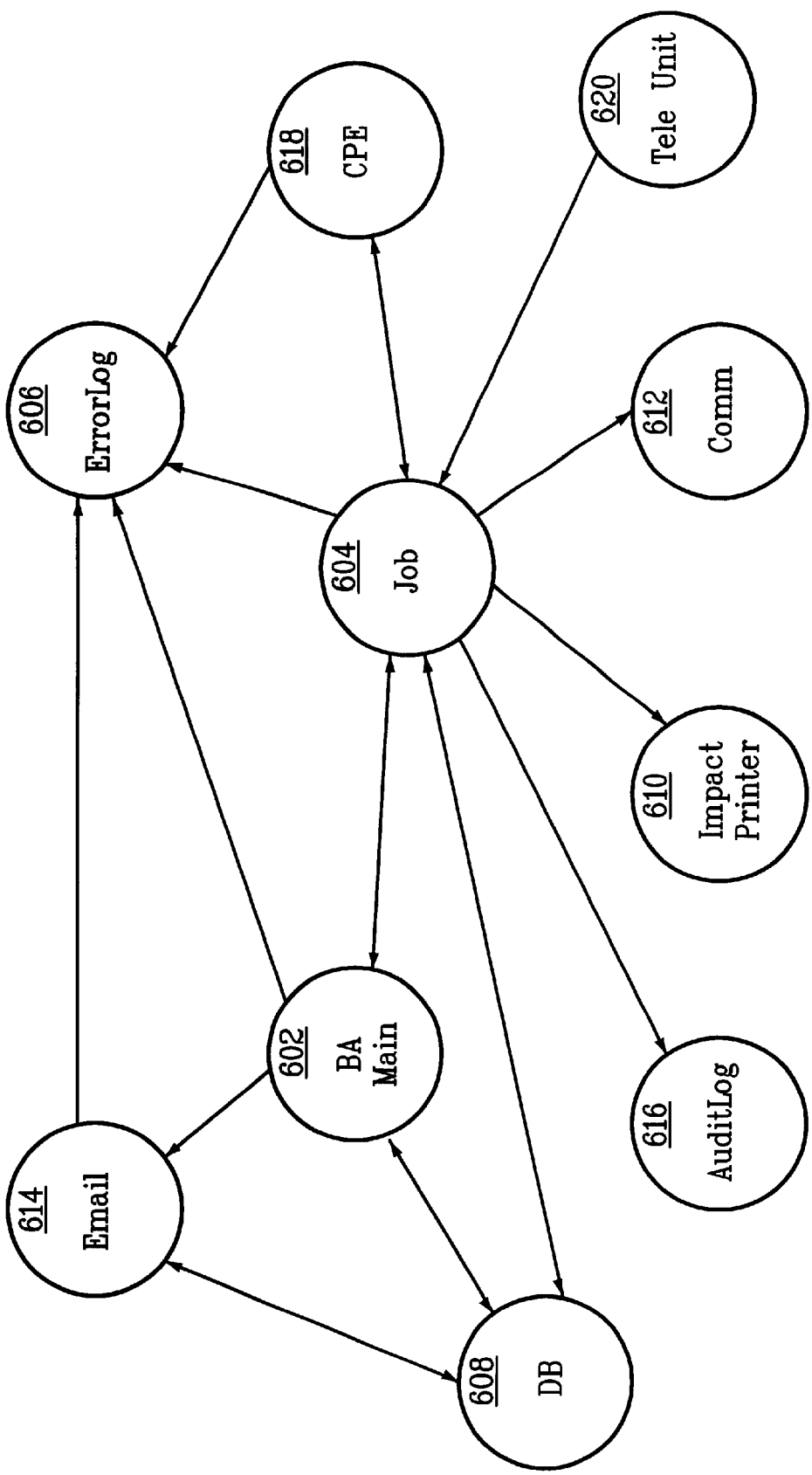
FIG. 6 is process flow for a preferred embodiment of the present invention.

FIG. 6 shows the flow of information in the preferred implementation for the background task 506. Background task 506 has the task of processing all the jobs that get entered into a job queue 604. A main background routine (BA Main) 602 creates several threads that continuously read job queue 604 until a job is fetched. Once a job is fetched, it is executed until completion or until an error occurs. Any errors are audited and written to an error log 606 in database 608 so the operator can view the errors. Any thread can process any type of job.

The various types of jobs are as follows: key generation, key distribution via a printer 610 or network 612, and email processing 614. All security critical events are audited in an audit log 616. This includes the generation, distribution, and destruction of key material as well as the establishment of secure communications links. Each job interfaces to a CPE 618 for key generation, encryption, decryption, and translation functions. Translation is the re-encryption of key material from a storage key to a distribution key or vice versa.

The Telephone Unit process 620 also submits jobs to Job queue 604. These jobs cause the creation of key based on existing key parts (components). Once the key parts are associated, the resultant key is distributed to all other equipment related to the equipment that was manually keyed from these key parts.

Figure 7:
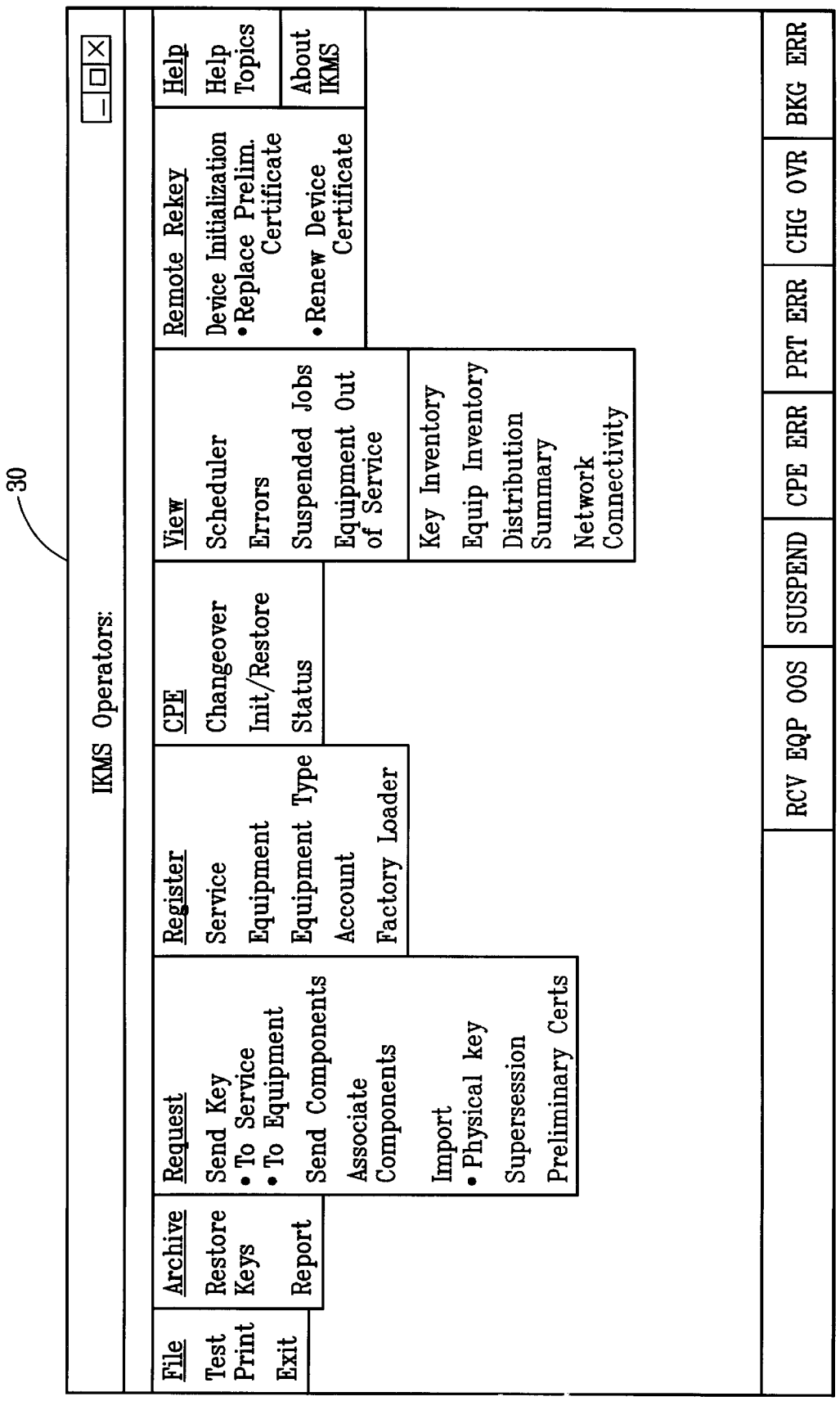
FIG. 7 shows a human machine interface for a preferred embodiment of the present invention

FIG. 7 shows a top level design of a human machine interface (HMI) for a preferred embodiment of the present invention. Operator initiated actions can be selected from a top level HMI screen 30 as shown. Preferably, the HMI is designed to help the operator accomplish key management tasks in an unambiguous way.

The IKMS Desktop is the main screen of the IKMS software application. Screen 30 is displayed when IKMS is started, and it can be minimized (by pressing the minimize button) or closed at any time. If screen 30 is closed, the IKMS program will be terminated and all associated IKMS screens will be closed as well. The IKMS desktop has a series of pull down selections at the top of the screen. The operator may choose from any of these items. The choices include File, Archive, Request, Register, CPE, View, Remote Rekey, and Help. There are multiple selections under many of these top-level selections. Each sub-selection will now be discussed in greater detail.

At the bottom of the IKMS desktop are a series of indicators that provide critical IKMS application status. Desktop indictors show when new jobs are suspended, when a "CPE error" is detected, when a "printer error" is detected, when a "communications error" is detected, when "changeover" is in progress, and when a "background error" is detected.

The File menu contains two sub-choices: Exit and Test Print. The Exit task allows the operator to log-off the IKMS application. The Test Printer task allows the operator suspend current print jobs and to align PIN forms in the printer.

The Archive menu selection has two sub-choices: Restore Keys, and Report. The Restore Keys task allows the operator to restore archived key material for distribution to equipment. Once restored, the key is distributed to the selected equipment, but is not retained in the local inventory. The service/key name, effective date, and key type of the desired service uniquely identify the keying material. The Archive Summary Report window lists all key material that has been archived over a user-defined period.

The Request menu selection has six sub-choices: Send Key, Import, Supersession, Associate Components, Send Components, and Preliminary Certificates.

The Request Send Key function supports a "Request Send Key to Service" and a "Request Send Key to Equipment" function. The Request Send Key to a Service function enables an operator to manually send key material to a service. This allows the keys for a group of equipment to be restored in a single operator action. The Request Send Key to an Equipment function enables an operator to manually send key material to a selected equipment. This allows the keys held in a piece of equipment to be restored in a single operator action.

The Request Import Physical Key function enables an operator to import a key from a foreign system so it can later be distributed automatically by IKMS. Keys within services can be defined with a source of import.

The Request Supersession function enables an operator to supersede keys in equipment. This function causes the current key in inventory to be deleted and a replacement to be generated if the key is associated with a valid service (or a valid equipment if the key is an equipment unique).

The Request Associate Components function enables an operator to select two components and associate them with a service to build an AATM or BATM key. A component is a key part. Key parts are combined through an exclusive-OR process to form plaintext keys. IKMS supports the generation of components (key parts) and their subsequent distribution to a key custodian. The address or destination of the key custodian is known as a receptacle. IKMS treats a receptacle like an equipment in that receptacles are registered with the system. During this registration process, the number of components to be generated along with the cryptoperiod of the components are defined. Components are then distributed to the receptacle. IKMS generates new components when a component is used to form a key, when components expire (and thus need to be replaced), or when the IKMS decides additional components are needed at a receptacle (Request Send Components).

The preferred embodiment of IKMS supports association of components by IKMS operator direction and through a telephone interface (such as a voice recognition unit). The manual association of components occurs through the Request Associate Components function, while the automated association occurs through the telephone interface. When associating components through the telephone interface, a user dials into the IKMS telephone interface and is prompted to identify him/herself.

Once successful user verification is made, the user is prompted to identify the equipment being keyed from components. Once the equipment is identified, the user is prompted to identify the key components to be associated with each key required by the identified equipment. For example, if the equipment is an ATM and requires an AATM key, the user will be required to enter the numeric identifier associated with both key parts. Once identified, the IKMS system will verify that the components exist in the database, combine those components, and send the resultant key to any other equipment associated with the service of which the ATM is part. Once components are used, they are deleted by IKMS and are no longer available for association in future requests.

The Request Send Components function enables an operator to manual send additional components to a Receptacle. This allows an additional number of components to be generated and sent without having to re-define the number of components distributed periodically to the Receptacle.

The Request Preliminary Certificates function enables an operator to create a userdefined number of unique preliminary device certificates. These certificates are used to initialize remote rekey capable equipment so that they can be securely keyed (from cold start) over open networks. The preliminary certificates are created and are sent to the operator identified factory loader system. Factory loader systems are registered as part of the Registration function described below.

The Register menu selection has five sub-choices: Service, Equipment, Equipment Type, Account, and Factory Loader.

The Equipment Type screens allow an operator to create a new equipment type, to select and modify an existing equipment type, or to delete an existing equipment type. The Add or Modify Equipment Type screen allows an operator to establish fundamental characteristics for a specific type of equipment. These parameters are common to all equipment of the type being defined (added) or modified. A type is uniquely defined by the combination of equipment type name, manufacturer, and model number.

The Register Equipment screen allows an operator to define, modify, and delete specific instances of a type of equipment. The operator can also use this function to change attributes of registered equipment. The Add or Modify Equipment screen allows operators to select or enter specific characteristics for specific equipment including the type of keys used by the equipment, its algorithm and its key distribution method.

The Register Service screen allows an operator to register or modify services defined within an IKMS account. A service is an association between one or more equipment and key material shared between that equipment. It can be thought of as a secure communications link. A service defines a set of equipment, the key material that is shared between that equipment, when the key material should be in use, and when the key material should be replaced.

The Register Account function allows the operators to register and modify the local IKMS account data. The local account information cannot be deleted. This function is also used to add, modify, and delete information about other accounts. The preferred embodiment uses the registration of other accounts to support distribution of key material between IKMS accounts.

The Register Factory Loader screen allows an operator to create, register and modify information regarding factory loader systems used to initialize remote rekey capable equipment at the manufacturer's site. It is necessary to register these loader systems so that messages containing files of preliminary device certificates (created by the Request Preliminary Certificate function) can be sent to the remote rekey capable device manufacturer where they (the certificates) can be loaded into the device. The preliminary certificates are used by IKMS to authenticate the device during its "cold start" and then to develop a secure session for loading the final unique device certificate.

The CPE menu selection has three sub-choices: Changeover, Init/Restore, and Status. The Cryptographic Processor Engine (CPE) Changeover is responsible for changing from one storage key to the next storage key. The storage key encrypts all keys stored by IKMS ensuring that all keys are stored securely. Before Changeover can be started, the next storage key must be loaded.

The CPE/Initialization/Restore storage key function is used to initialize the currently installed CPE card. It is used when a card has been installed for the first time, to re install a card when an error or other problem is determined, and to install a new card when the current card has failed. The CPE Status function is used to test the currently installed CPE card, and to retrieve information identifying the currently installed card.

The View menu selection has eight sub-choices: Scheduler, Errors, Suspended Jobs, Equipment Out of Service, Key Inventory, Equipment Inventory, Distribution Summary, and Network Connectivity.

The View Scheduler function allows the operator to graphically see the key material distributions and imports that are scheduled for the next seven days beginning with today. It also allows the operator to view the percent complete of any ongoing Changeover and the percent full of the Audit Log. These functions are selected from the desktop by selecting View→Scheduler. When invoked, a multi-tab window appears. One tab shows the pending distributions, one tab shows the pending imports, and the last tab shows the status of Changeover and the Audit Log.

The View Errors function allows an operator to list (i.e., view) current IKMS application errors.

The View Suspended Jobs function allows an operator to list (i.e., view) IKMS jobs that are suspended. Jobs are IKMS activities that are automatically scheduled to occur based on a registered service or other operator initiated activity.

If the system detects an application level negative acknowledgement or time out while performing an Electronic Symmetric Distribution, the Distribution History status for the message is changed to "failed". When this occurs, the operator is notified (via a pop-up window) that a key package was not acknowledged and the "Receiving Equipment Out of Service" indicator is set on the Main Desktop. The equipment that is taken out-of-service is placed on the Equipment Out of Service list (which can be viewed by selecting View Equipment Out of Service). IKMS will not attempt to distribute key material to any equipment on this list. All key distribution jobs associated with an equipment that is out-of-service are suspended and will be retried when the equipment is successfully fixed and thus removed from the Equipment Out of Service list.

The View Key Inventory function allows an operator to list (i.e., view) all key material held securely in the IKMS database. The View Key Distribution History window, accessed from the View Key Inventory window, allows an operator to see the distribution history of the selected key name and key type. All versions associated with the selected key name and key type are displayed in this list.

The View Equipment Inventory function allows an operator to list (i. e., view) all equipment registered in the IKMS database.

The View Distribution Summary function allows an operator to see the distribution history of all key material over a selected time frame.

The View Network Connectivity function lists the communication relationship (the services) defined within IKMS and shows the type of cryptographic protection provided by this communication relationship (i.e., the keys and algorithms).

The Remote Rekey menu selection has one choice: Device Initialization. Once a device has been initialized at its factory, it is shipped to site and then further initialized by IKMS. Device Initialization uses the preliminary device certificate to mutually authenticate with the device and then to develop a secure data channel for the distribution of a newly generated unique device certificate. The IKMS ensures that each preliminary certificate is used only once (by any device). Device Initialization allows the replacement of the preliminary certificate or the renewal of the existing device certificate. Remote rekeying is described in greater detail below.

The Help menu selection has two main sub-choices: Help Topics and About IKMS. Help Topics displays the Table of Contents, Keyword Index list, and the Database Search. The question mark button on the toolbar also presents the Help Topics window. Help Topics also shows the copyright notice and version of IKMS. The Toolbar's Context Help button (the arrow and question mark button) allows an operator to double click in an IKMS window (such as another Toolbar button or pull-down menu item) and receive help information on the use of that menu item or button. The Help topic will be shown for the item selected.

At the bottom of the IKMS desktop is a status bar with informational indicators that provide critical status on the state of the IKMS application. Indicators in the status bar include: Suspended jobs indicator, CPE error indicator, Printer error indicator, Communications error indicator, Changeover in process indicator, and Background error indicator.

When the CPE Error indicator (shown by the "CPE ERR") or Communications Error indicator (shown as "COMMS") is activated, they are reset, preferably, only through their next successful use. IKMS continues to attempt processing each function when it has failed. No operator intervention is required to reset these indicators.

The Suspended job indicator can be acknowledged through the Suspended Jobs window. The Printer Error indicator refers to a problem with a printer, and solving the printing problem resets the Printer Error Indicator. The Changeover In Process indicator lets the operator know that changeover is currently proceeding.

The 'Clear Status' buttons located on the View Detail window associated with the desktop indicator clear the status indicators on the desktop so that new errors or suspended jobs can cause the indicator to re-activate. Preferably, these buttons have no effect on the actual errors or suspended job status.

The Receiving Equipment Out of Service (OOS) indicator shows the operator when equipment has been placed out of service because of communications failure or timeout. The equipment placed out of service can be viewed in the View>Receiving Equipment Out of Service screen. Pressing the 'Clear OOS' button resets this indicator.

A preferred embodiment of the present invention has been designed in "WINDOWS NT" using "VISUAL C++." It should be understood that a "WINDOWS" application can be designed to be "modeless," i. e., to allow the operator to invoke windows from different functions simultaneously. For example, if the operator were registering a cryptographic link (e.g., a service), and discovered that the equipment to be included in the service was not registered, the operator could call the "register equipment" function and register the equipment without closing the "register service" window. Messages can then be passed between the open windows to ensure each affected window is updated properly.

Preferably, IKMS executes processes that can be initiated either manually or automatically. Manually initiated processes can be invoked through the operator's use of the HMI described above. Automatic processes can include scheduled replacement of key material (which can be set up by the operator when the equipment and cryptographic network are defined), and requests for remote rekey from remote devices. The automated tasks of scheduling and remote rekey are described in detail below.

Automated Scheduling

In an automated scheduling method according to the present invention, an operator first defines equipment types and equipment instances, and then associates equipment with cryptographic links (or networks). To build the cryptographic link association, the operator first selects equipment to be associated, and then selects the number and type of key or keys that must be delivered to the equipment in this link. The operator then establishes how the assigned keys are created (e.g., generated by IKMS or imported from a "foreign" system), and defines the cryptoperiod of each key. The cryptoperiod defines the "life" of the key, i.e., for how long a delivered key may be used.

The scheduling function monitors the cryptoperiod for the key on defined cryptographic links, and automatically schedules the delivery of new key to these links when the cryptoperiod expires. The system always delivers the key slightly in advance of its need date (or time). The delivery time is based on the time associated with the delivery method coupled with the cryptoperiod of the key. For example, if the delivery method is "physical" then at least one day could be needed to generate the physical key and have it sent to the equipment via a one day delivery service. If the method were remote rekey, the network can be used to send the key minutes before it expires.

Figure 8:
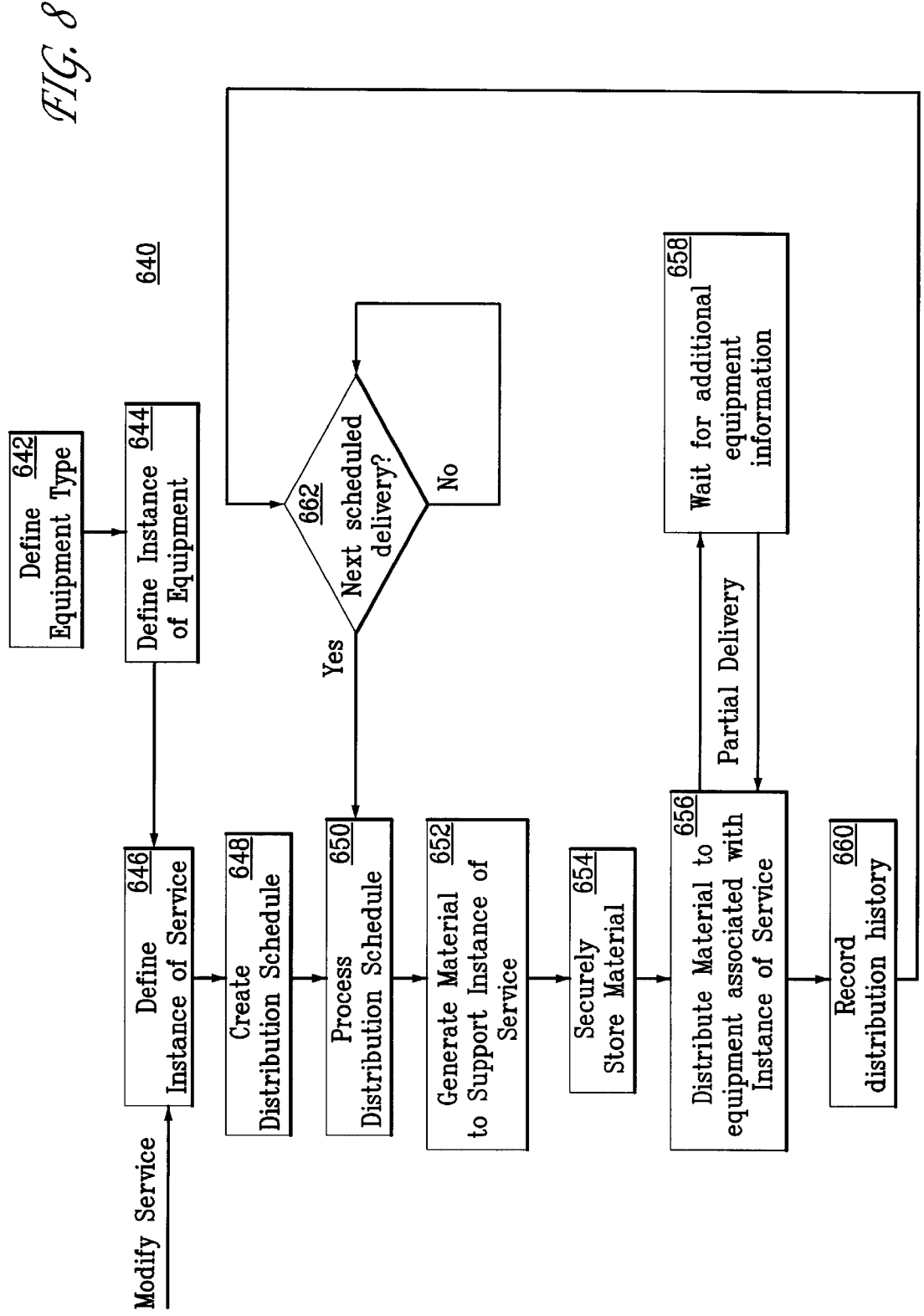
FIG. 8 is a flowchart of an automated scheduling process used in conjunction with the present invention.

FIG. 8 is a flowchart of an automated key generation and distribution process 640 according to the present invention. Before keys are generated and distributed, the equipment to receive the distribution must be registered in the system and associated with a secure communications service. The secure communications service establishes the communication link or network that the user wants to protect through cryptography. The key material generated for this service enables the cryptography to protect the link. Classes of equipment are registered with the system at step 642. In this step the general characteristics of the equipment class are defined. This includes the type of equipment, the number of services it can participate in, the types of keys that can be distributed to the equipment, and the types of distribution methods supported by the equipment. Once the equipment classes are defined, specific instances of the equipment are registered at step 644. Here the specific network cryptographic algorithm is selected as well as the specific key types to be distributed and the specific distribution method.

After defining specific equipment, the equipment is grouped into secure communication services at step 646. Here the operator is defining the secure communication links between selected equipment. Equipment that is to communicate securely is selected, as well as the types of secure links this equipment will share. Each secure communication link is protected by a key. Thus there is a one to one relationship between secure communication links and keys. For each defined link (key), the type of key and its cryptoperiod are defined as well as it generation source. The system allows keys to be generated by IKMS, to be imported from other key management systems, or to be created from key parts that are already in the field.

Once the secure communications links are defined (at step 646) the system creates a distribution schedule at step 648, and processes the schedule at step 650. This is based on the cryptoperiod of the material, the lead time associated with the distribution method, and the in-service date entered when the secure communication link was created. For example, if today is Sep. 28, 1990 and a secure communications service is defined to begin on Oct. 1, 1990 then the system schedules the creation and distribution of that key automatically to support the physical parameters associated with the registered equipment in the secure communications service. If the equipment gets key delivered physically, then it must be created before its need date to allow time for mailing. In this case the key would be created 2 days ahead of time to allow the key to be sent by overnight mail so that it will be at the equipment for use by Oct. 1, 1990. The generation process occurs in step 652.

Once a key is generated, it is securely stored, at step 654, in a local database encrypted under a protection key. The key is then distributed, at step 656, to each equipment associated with the secure communication service based on the distribution method and the lead time associated with that distribution method. If problems arise and the key can not be delivered to all equipment in the secure communication service, then the system keeps track of this and allows the distribution to be re-tried once the problem is corrected (step 658). Each distribution is recorded, at step 660, so that a record of all distributions is available. This distribution record includes what was distributed, who initiated the distribution, when the distribution occurred and the status of the distribution (success or failure). At step 662, the scheduler process automatically tracks distribution based on the cryptoperiod of key material and will schedule the generation and distribution of replacement key based on the key's cryptoperiod.

Remote Rekeying

IKMS also supports secure remote rekey of cryptographic devices via public or private networks. Remote rekey support is provided by a rekey method and secure communications protocol that support the secure, authenticated distribution of key material to cryptographic equipment such as ATMs, NSPs, and Financial Switches (FS), via the network connection to that element. Remote rekey involves three stages: preliminary initialization, device initialization, and net operation. IKMS participates and supports the first stage (preliminary initialization) but, in a preferred embodiment, does not directly load the preliminary certificate into the device. Preferably, the loading of the preliminary certificate is performed by a certificate loader at the factory site. The certificate loader can be a PC. The IKMS directly performs the last two stages of the rekey process (device initialization and net operations). During the rekey stages, the cryptographic device (or secure device) is taken through a series of states that include loading remote rekey initialization data to secure delivery of operational key material.

Preliminary initialization supports secure authentication of the device initialization process. Preferably, preliminary initialization is performed at a physically secure facility within the factory. Preliminary initialization can occur in the field, but this is less secure. The security device is connected to a local network and receives its preliminary certificate from the Factory Certificate Loader over the network. Standard network protocols (e.g., TCP/IP) can be used to transport the messages. Network protocols specific to a security device (e.g., ISO-8583) can also be used. The security device is provided with its preliminary certificate, which it stores. The certificate allows the device to prove its identity to another device that has the same IKMS authentication parameters (i. e., a certificate signature based on the same IKMS root certificate).

Device initialization involves creating a new unique device certificate, and then securely loading that certificate (both public and private parts) into the device using the preliminary certificate in the device. Since the loading process is secure, device initialization can be performed over open networks, and thus, can be performed remotely. IKMS ensures that each preliminary certificate is only used once by any device. Once the new device certificate is loaded, the old preliminary certificate is destroyed. Attributes in the preliminary certificate prevent their use with other preliminary certificates to perform secure communications. The preliminary certificate is only used to provide a secure authentication channel for the receipt of the device certificate.

Device initialization can be performed using open networks and standard protocols, including service network specific protocols such as X9.2. This is possible because the preliminary certificate is used to create a secure channel between the IKMS and the security device. After the secure connection is established and authenticated, the IKMS account distributes a device specific certificate and user specific authentication parameters to the security device. The security device permanently stores the device certificate and authentication parameters. These data are used for future key distribution activities.

During net operation, the IKMS account uses the device certificate and authentication data to establish a secure, authenticated link to the security device over the communications path used for normal operations. This communications path includes all transport protocols used by the network. After the link is established, the IKMS account distributes the keys necessary to activate the specific cryptographic link. Key material is securely and automatically sent to each equipment in the link. If the key is periodically replaced, the IKMS account periodically establishes the secure, authenticated link, and provides the periodically changed key. A secure session can be established via the remote rekey protocol (as appropriate) for each equipment assigned to the cryptographic link.

Remote Rekey Life Cycle Process

The ability to rekey a device remotely over public networks (or any unsecured network) requires a key management process that is manageable with the cryptographic strength necessary to withstand attacks on the public network. The ultimate goal of any automated remote rekey process is to provide a keying capability that simplifies the key management process while improving the security of the management process. The development of Integrated Key Management System (IKMS) and its associated Remote Rekey protocol accomplish these goals. The process of key management is automated and simplified by allowing system managers to initiate keying activities over networks remotely without having to send two-person teams to an equipment site. The overall security of the process is improved through the use of strong public/private cryptographic and authentication mechanisms coupled with extensive audit collection capabilities and operational controls.

Figure 9:
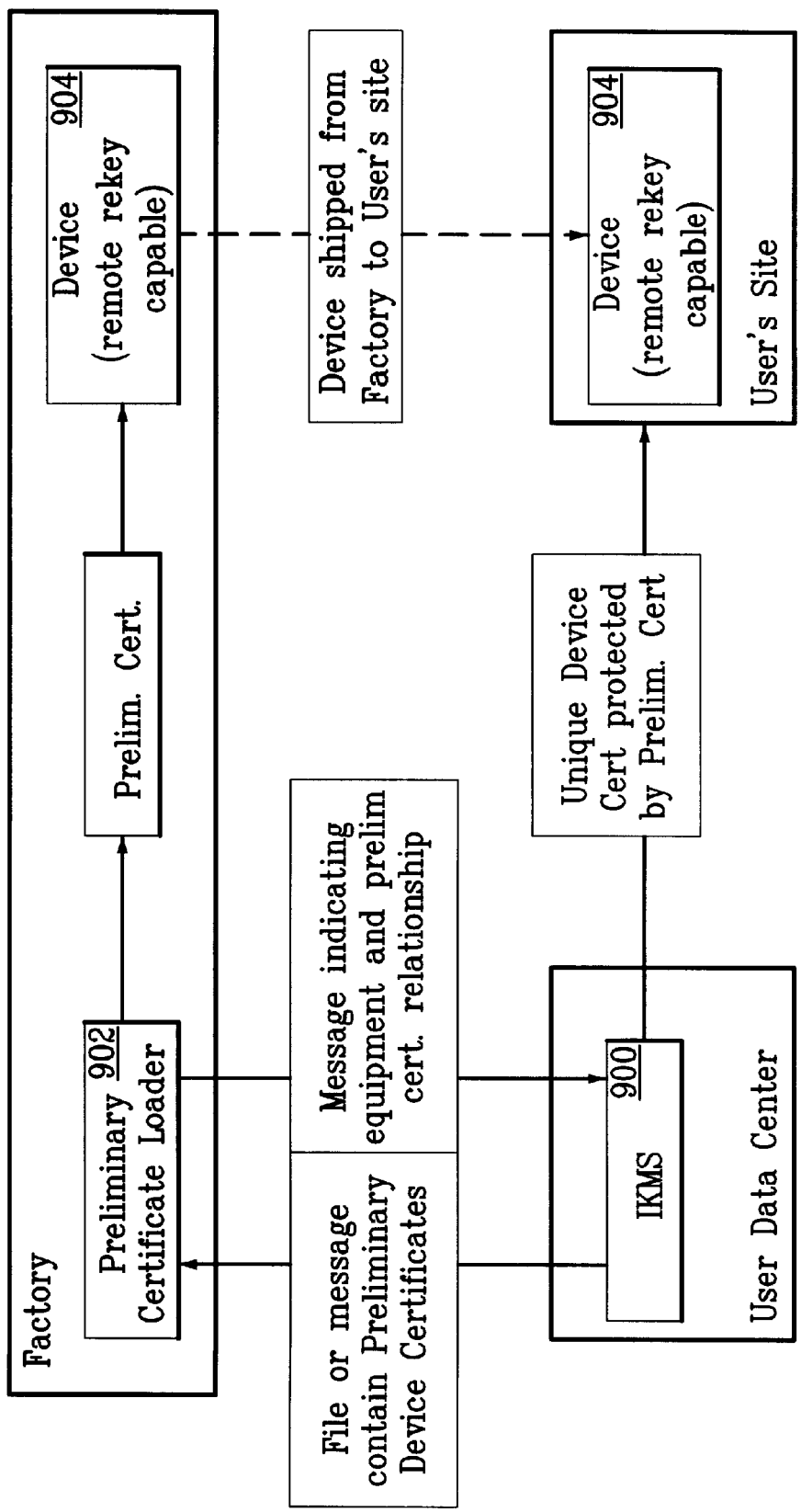
FIG. 9 shows the connectivity of a remote rekey system.

FIG. 9 shows the connectivity of a remote rekey system. A Preliminary Certificate Loader 902 is located at the manufacturer and is used to perform the preliminary initialization function. This system (902) manages the preliminary initialization of a device in a secure environment. Once initialized, the device 904 is shipped to its operational location and placed in service where all subsequent keying operations can occur over open networks. IKMS 900 supports the preliminary initialization process by providing a message or file containing the preliminary device certificates. IKMS 900 generates some number of certificates based on the manufacturer need. This file/message contains both the public and private components of the certificate and must be protected. Since the preliminary certificate is only used to securely load the actual device 904 certificate and since the preliminary certificate can only be used once, its loss or compromise is manageable with limited security risk.

The Preliminary Initialization process consists of loading a device 904 with with a preliminary certificate thus providing device 904 with an authenticatable identity. The Preliminary Certificate Loader 902 provides a signed preliminary certificate to device 904. This certificate provides a means to authenticate the identity of the device. Preliminary Certificate Loader 902 is used during the manufacturing process to load devices with the key material necessary to support secure key delivery to the devices once they are fielded at a customer site.

Preliminary Certificate Loader 902 receives all of its preliminary certificates from IKMS 900. Preliminary Certificate Loader 902 does not require cryptographic gear to load the certificates, however, it may be prudent to protect the distribution of preliminary certificates between Preliminary Certificate Loader 902 and IKMS 900 using cryptography or physical security. Upon loading a preliminary certificate, Preliminary Certificate Loader 902 sends a message to IKMS 900 informing it which device 904 was loaded and which preliminary certificate was used. This information is recorded with the Equipment's registration (in IKMS 900) and is subsequently used to ensure that only this equipment can be "converted" using the loaded preliminary certificate. Once device 904 has completed the preliminary initialization, device 904 is shipped to its operational site. Once there, IKMS 900 can be used to complete the device initialization and network operations stages of the remote rekey protocol.

IKMS 900 is used to device initialize device 904 once device 904 has been shipped to the organization's operational site. IKMS 900 communicates with device 904 over open networks, and exchanges certificate information. Device 904 provides its preliminary public certificate, while IKMS 900 provides its device public certificate. IKMS 900 verifies the identity of device 904 using the preliminary certificate. Verification ensures that this is the first time the preliminary certificate has been used, and that the device's identifier matches the preliminary certificate. This information was returned by Preliminary Certificate Loader 902 to IKMS 900 during the preliminary initialization phase.

Once device 904 has been authenticated, IKMS 900 and device 904 develop a secure channel using key exchange algorithm parameters passed during the certificate exchange. Preferably, the key exchange algorithm is Diffie-Hellman, and the algorithm will be 2 or 3 key triple-DES in the CBC or ECB mode. A preferred embodiment of IKMS supports multiple key exchange algorithms, and multiple encryption algorithm/modes. The actual algorithm used is based on the security need determined at the time of use.

IKMS 900 then generates and sends a device public certificate (both public and private parts) to device 904. The device public certificate is protected in the secure communication channel developed between IKMS 900 and device 904. Two layers of protection are used. The channel is protected by encryption while the public/private key pair is protected by another layer of encryption. The Key Exchange Algorithm process provides the keys necessary to implement both layers of encryption. Once device 904 receives the new certificate, it replaces its preliminary certificate with the new one. Preferably, the old preliminary certificate is never used again. IKMS tracks this to ensure it will never be used again.

Device 904 is now ready for remote rekey use, and can now be placed into a key distribution service. A service defines the relationship between registered equipment and their associated algorithms and types of key material. The registration of a service defines what key (including algorithm and type) should be created for each link, what equipment participate on a link, and how long the key should exist on a link before creating a new key.

Figure 10:
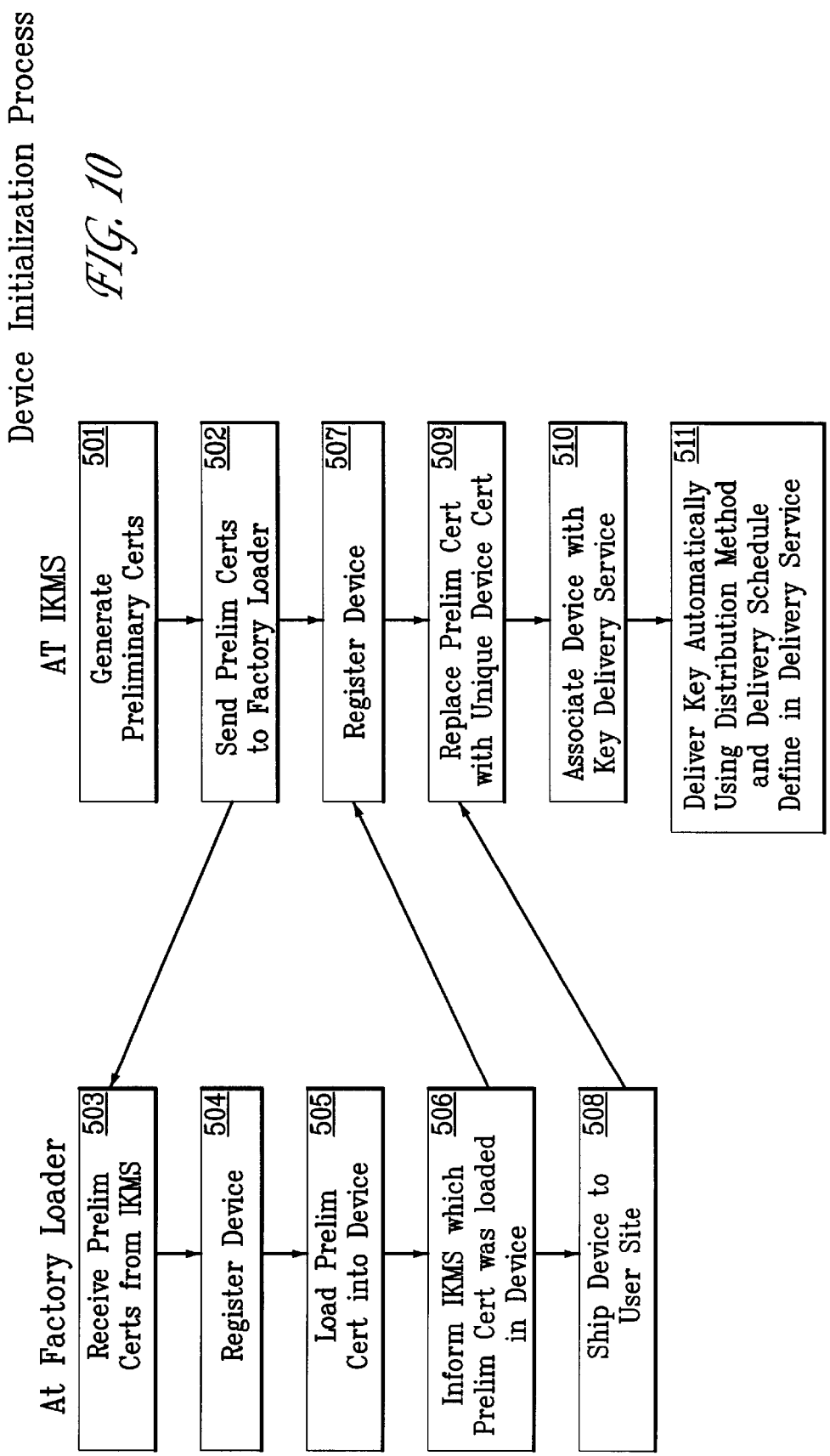
FIG. 10 depicts a device initialization and key delivery process.

Equipment associated with a service has a defined distribution method. Preferably, the distribution method is remote rekey. Other methods include physical (i.e., split knowledge) delivery, or electronic symmetric delivery. The most secure delivery method is remote rekey. IKMS 900 supports multiple distribution methods, as the remote rekey function typically will not be implemented in equipment instantaneously. Consequently, IKMS handles legacy distribution methods as well as new ones. The preferred distribution method to device 904 is the remote rekey method. Once placed in a service, key distributions are automatically scheduled and will occur using the remote rekey process. The following sections describe in detail how the IKMS implements each phase of the remote rekey process (from initialization to key delivery). The entire remote rekey initialization and key delivery process is depicted in FIG. 10.

The rekey initialization process begins at step 501 with the creation of preliminary public/private key pairs at the IKMS. The IKMS then sends, at step 502, a message or file containing the preliminary public/private key pairs to the Factory Loader. The Factory Loader receives the preliminary public/private key pairs at step 503. The operator or a factory inventory system registers the newly manufactured device with the Factory Loader at step 504. A preliminary public/private key pair is selected and loaded into the device at step 505. At step 506, the loading process automatically sends a message to IKMS informing IKMS which device (or devices) have been loaded, and which preliminary public/private key pair(s) are associated with that equipment. IKMS receives this notification, at step 507, and automatically registers the device in its database. The IKMS may be required to augment this registration to include additional information such as the network address of the device at it final location.

The device is shipped from the factory to a designated customer site at step 508. Once the device is at the appropriate site and properly configured for its operational network, device initialization is started at step 509. During step 509, the preliminary public/private key pair is replaced with a device public/private key pair. IKMS creates this key pair and sends it to the device using the protocol described below with reference to FIG. 13. Once the device is fully initialized it is ready to participate in a remote rekey service.

The IKMS operator registers the device in an appropriate service at step 510. Once registered, IKMS automatically distributes the appropriate operational key material to the device, at step 511, using the key distribution method defined for the device (remote rekey in this case).

Figure 11:
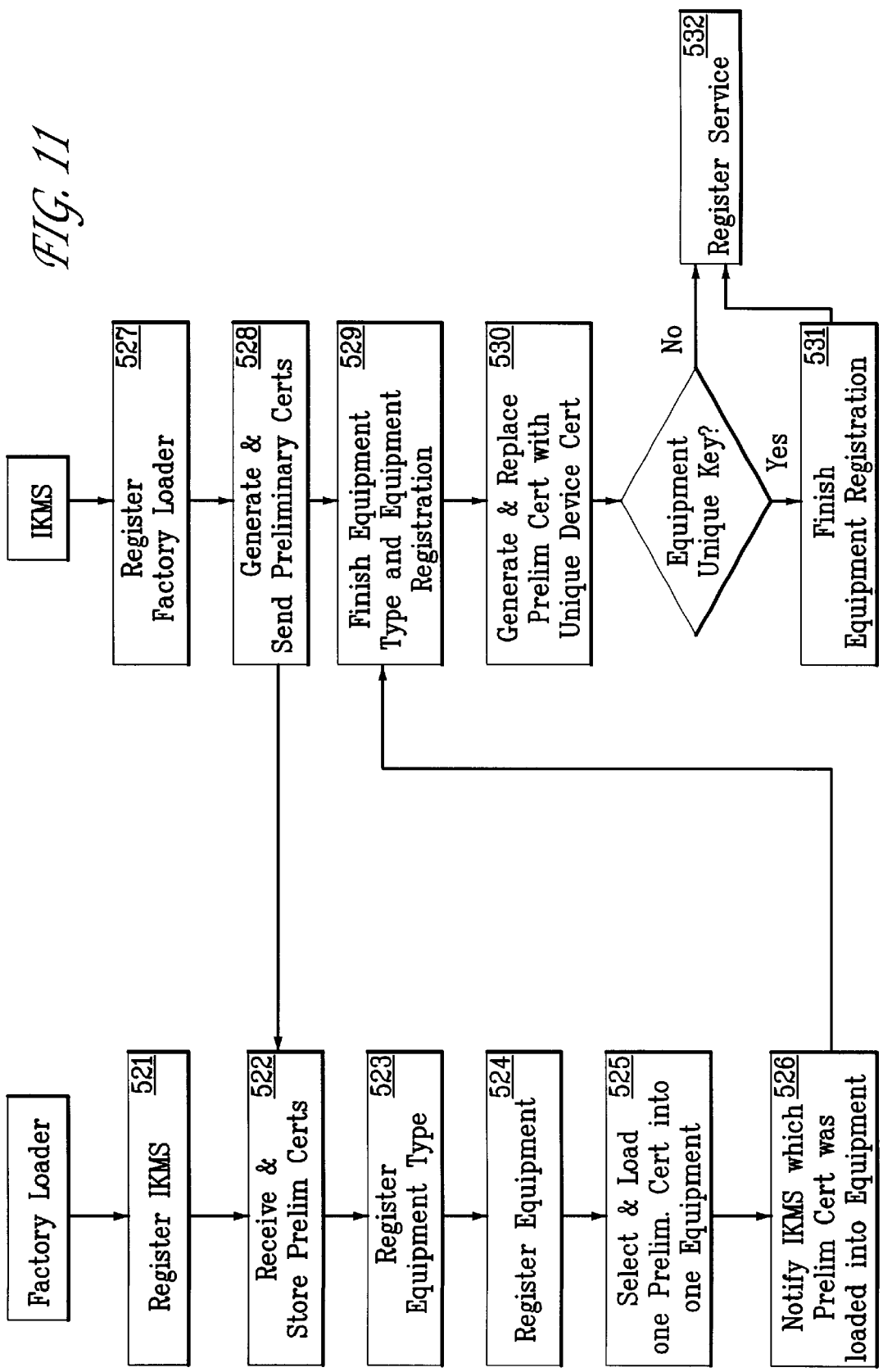
FIG. 11 is a flowchart of an IKMS initialization process.

FIG. 11 shows the sequence of operator steps that are conducted at the Factory Loader and the IKMS to initiate a full remote rekey initialization. These operator steps are used to implement the process flow described in FIG. 10.

Preliminary Initialization Process

The Preliminary Initialization process loads the device with a preliminary certificate signed by IKMS and the associated private value. The device must be manufactured with a key exchange capability that matches the type of preliminary certificate (and subsequently device certificate) loaded into the device. The operator activities required at the Factory Loader and the IKMS to accomplish Preliminary Initialization are shown in FIG. 11 and described in detail below.

The Preliminary Initialization process begins at step 521 with the operator coordinated registration of the IKMS at the Factory Loader, and at step 527 with the registration of the Factory Loader at the IKMS. The registration of the Factory Loader and IKMS configure both systems to inter-communicate and provide a weak level of inter-system authentication.

Once the systems are registered, the IKMS operator requests, at step 528, that IKMS generate some number of preliminary public/private key pairs. These key pairs are securely stored in the IKMS database and are tracked (i e., audited). Once generated, the key pairs are sent to the operator identified Factory Loader system. The key pairs can be sent via floppy disk or via e-mail. If the values are sent via e-mail, the e-mail should be encrypted to protect the values in transit. If sent via floppy disk, they should be physically protected and tracked during shipment (e.g., sent via registered mail or Federal Express).

The operator at the Factory Loader receives the preliminary public/private key pairs, at step 522, and loads them into the Factory Loader system. The Factory Loader operator then registers devices, i.e., equipment types and equipment instances, that are to be initialized and sent to this customer at steps 523 and 524, respectively. The registration of devices to be initialized can be manual or can be automatic. For example, a factory inventory system can automatically communicate the registration information to the Factory Loader. Once registered, the Factory Loader operator selects the equipment, selects one of the preliminary public/private key pairs, and requests the Factory Loader to send it to the equipment (i.e., device) at step 525. Again, this process could be automated to eliminate the need for operator intervention.

After successful preliminary public/private key pair loading, the Factory Loader system sends a message to IKMS, at step 526, informing it as to which equipment has been initialized, and which preliminary public/private key pair was loaded. The IKMS stores this information, at step 529, and creates an equipment registration record as necessary. It also stores the equipment-public/private key pair relationship so that this relationship can be tested when the equipment is device initialized. Preferably, the IKMS operator also enhances the equipment registration record to include the network address, key types supported by this equipment, network algorithms supported, and key distribution methods supported. To automate this process, all information except the network address could be defaulted or sent from the Factory Loader system. At this point, Preliminary Initialization is complete.

Device Initialization Process

The Device Initialization process replaces the preliminary public/private key pair loaded in the device during the Preliminary Initialization phase with a unique device public/private key pair. During this phase the device is authenticated (using the preliminary certificate), coupled with a check to ensure that the preliminary certificate and the device ID match one another, and that the preliminary certificate has not been used before. The device replaces its preliminary public/private key with the new device public/private key. All device initialization activities are performed at IKMS. The operator activities required at IKMS (to accomplish Device Initialization) are shown in FIG. 11.

The Device Initialization process begins, at step 530, when the IKMS operator selects a preliminary initialized device and requests that it be device initialized. IKMS creates a new public/private key pair for the device. This key pair is stored securely in the IKMS database. IKMS then requests the device to provide its current certificate and key exchange algorithm public parameters. This data is provided over a public network. The device provides its preliminary public certificate (which is signed by the IKMS). The IKMS validates the certificate, verifies that the device ID and the certificate are associated, and then provides the replacement public/private key pair.

The public/private key pair is sent in a message that is encrypted (for data protection). The message contains decryption instructions (which include the IKMS' key exchange algorithm public values), and an encrypted payload that contains the IKMS public certificate, the new device public certificate, additional decryption instructions, and a cryptogram containing the new device private value. The device receives this message, decrypts it, verifies the IKMS certificate, and then decrypts the private value. The device then stores the new public/private values and destroys the old preliminary public/private values. If the device needs a unique operational key, then the IKMS operator modifies the equipment registration, at step 531, to include this. This causes the IKMS to generate and send the unique operational key to the equipment using the remote rekey method. The device initialization protocol is described in greater detail below with reference to FIG. 13. Once this is complete, the device (i.e., equipment) is Device Initialized, and is now available for use in a key distribution service.

Remote Secure Key Delivery Process

The Remote Secure Key Delivery Process is used to deliver operational key to a device. This process is facilitated by registering remote rekey capable equipment in a key distribution service (FIG. 11 at step 532). Registration of an equipment (i.e., device) in a service establishes a relationship of this equipment to others, identifies the type of algorithm used to protect the communications link between the associated equipment, defines the type of keys to be commonly shared between equipment, defines the source of those keys, and defines the length of time each key will live. Once the service is established, IKMS automatically schedules the generation and distribution of these operational keys to the equipment defined in the service. IKMS distributes the operational key using the preferred key distribution method associated with the equipment when it was registered. When the preferred method is remote rekey, then the remote secure key delivery process is used. This process is described in detail with reference to FIG. 14.

The Remote Secure Key Delivery Process begins when IKMS requests the device to provide its current device certificate and key exchange algorithm public parameters. This data is provided over a public network. The device provides its device public certificate (which is signed by the IKMS). The IKMS validates the certificate and then provides the operational key. The operational key is sent in a message that is encrypted (for data protection). The message contains decryption instructions (which include the IKMS' key exchange algorithm public values), and an encrypted payload that contains the IKMS public certificate, additional decryption instructions, and a sequence of cryptograms containing the operational key. The device receives this message, decrypts it, verifies the IKMS certificate, and then decrypts and stores the operational keys.

Other Life-Cycle Key Management Processes

IKMS provides other critical key management functions that support life-cycle key management activities beyond the initial generation, secure storage and secure delivery of key material via remote rekey. These additional functions can include: re-sending key material to equipment or to a service; viewing scheduled tasks; superseding key material; importing key material; auditing critical system events (such as key generation, key distribution, key destruction and selected registration activities); changing over the secure key material database to a new storage key; determining the cryptographic hardware's status; initializing and/or restoring the cryptographic hardware; viewing and dealing with IKMS errors; viewing and retrying or deleting suspended tasks (such as distribution attempts that failed due to missing material or a communications failure); archiving key material; restoring and distributing archived key material to an analysis workstation; recovering from a disaster; providing critical reports (such as archive, inventory, distribution summary, and distribution history).

The above functions allow the manager of keying material to re-deliver keys to a device or group of devices to support failures or repairs. This also supports recovery from a compromised device or secure link. Keys may be imported from other systems and distributed to services defined within IKMS. All generation, distribution, destruction, and critical registration activities are audited so information is available to conduct investigations should an IKMS be misused.

Preferably, cryptographic processing is performed in a hardware accelerator. This isolates all cryptographic functionality to a tamper proof boundary that ensures that all key material and cryptographic processing is secure, and cannot be accessed without proper privileges. Provisions have been made to recover from a failure in this cryptographic hardware. All key material is stored securely as cryptograms in a database. Preferably, IKMS provides the ability to change the key used to protect the key database. Key material can also be securely archived so it can be retrieved at a later time, should an investigation or other critical business recovery need be required. A series of management reports is provided to help the IKMS user understand what key material is held securely in its inventory, what equipment (devices) are currently registered, and what locations (devices) have received material (including the name, version, key type, and date of the distributions). These reports help the IKMS user manage the equipment and its key material. Finally provisions have been made to support catastrophic failure of an IKMS by using advanced database replication functions. This capability allows IKMS to quickly recover from major catastrophic events such as earthquake, flood, tornado, or fire.

Remote Rekey Protocol

The Remote Rekey process described above can be implemented through an IKMS that utilizes a remote rekey protocol that is shared between the IKMS and equipment it remotely keys. This Remote Rekey protocol supports the initialization of a device (equipment) at the the factory (i.e., preliminary initialization), supports the initialization of devices in the customer's possession (i.e., device initialization), and finally supports the secure delivery of key material through the communication channels within the customer's network. Three distinct protocol phases are used to provide the needed functionality. These phases include the preliminary initialization phase, the device initialization phase, and the secure key (material) transport phase.

Preliminary Initialization Phase

Figure 12:
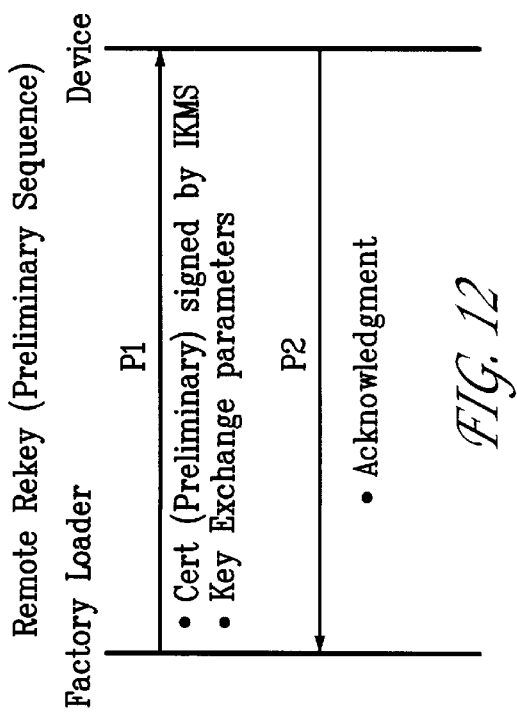
FIG. 12 shows a simplified set of message exchanges that are used to complete the Factory Initialization phase of a remote rekeying protocol according to the present invention.

The Preliminary Initialization phase is used to provide a device with a preliminary public/private key pair signed by the IKMS so that the device can be authenticated and subsequently participate in the creation of a secure channel during the Device Initialization phase of the protocol. FIG. 12 shows a simplified set of message exchanges that are used to complete the Preliminary Initialization phase of the protocol. The exchange of messages is between the Factory Loader (typically a non-cryptographic device) and the Device should occur in a secure environment to ensure that the device is initialized correctly and can be trusted when it undergoes the Device Initialization phase.

During the Preliminary Initialization phase, the device is zeroed, and then loaded with a preliminary public certificate (signed by IKMS) and its associated private key (P1). It is typically expected that the device would be manufactured with an inherent cryptographic algorithm and set of algorithm modes. This would include a data/key encryption capability and a key exchange algorithm capability. It is possible that the rekey protocol could support software download or other parameter download to tailor an equipment to operate in a particular cryptographic fashion (for example, load/configure an elliptic curve capability in lieu of a Diffie-Hellman capability). The current preferred implementation does not support this ability because of the complexity and the difficulty in managing such a feature.

The preliminary public/private key pair is compliant with standard specifications. For example, the public key is X.509 version 3 compliant. Typically the certificate should be signed using SHA-1/RSA or SHA-1/DSA. Other standard combinations are possible. The public certificate also contains attributes that limit its use for conversion of key only. That is, this public/private key pair can only be used to authenticate and establish a secure communications channel for the purpose of loading the actual device public/private key pair. The attributes in the public key (signed certificate) prevent it from being used for any other purpose (such as a normal key distribution or secure data communications).

The device accepts the public/private key pair and stores it in a non-volatile location. The device responds to the public/private key pair load with an acknowledgement message (P2). This message indicates whether the load was successful or whether the load failed.

The device has now completed preliminary initialization and can be shipped to its installation location. Once installed at the customer location, the device is "device initialized." Device initialization provides the device with a new public/private key pair that is uniquely created by IKMS for this specific device. It replaces the preliminary public/private key pair. Use of the preliminary public/private key pair allows the secure delivery of the actual device certificate over a public network without requiring split knowledge or two-person control. Since the preliminary public/private key can only be used once and its use is limited to "key conversion," the loss or compromise of this key is minimized.

Device Initialization Phase

The Device Initialization phase is used to provide the device with the unique device public/private key pair in a secure manner over an open network.

Figure 13:
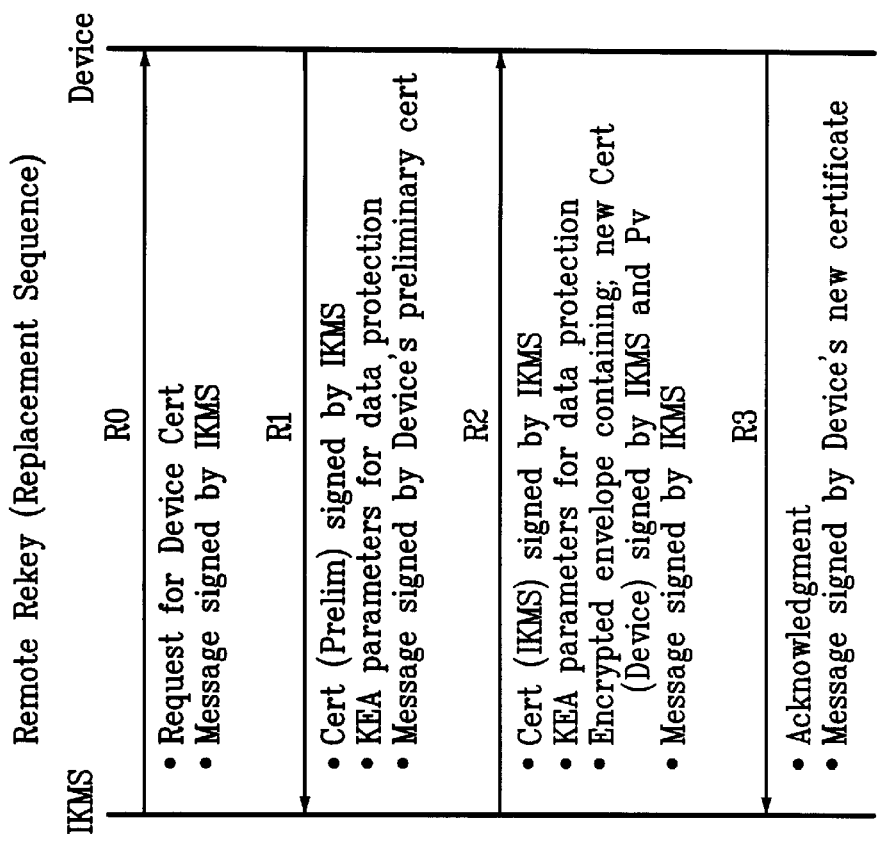
FIG. 13 shows a simplified set of message exchanges that are used to complete the Device Initialization phase of a remote rekeying protocol according to the present invention.

FIG. 13 shows a simplified set of message exchanges that are used to perform the Device Initialization phase of the protocol. During this phase the exchange of messages between the IKMS and the Device typically occurs over open networks. The authenticity of the source and destination of all message exchanges can be verified by using the certificate chain associated with the IKMS root public key. The use of the IKMS root key prevents other IKMS systems (owned by other organizations) from taking over local devices, since their root keys will be different.

The purpose of the Device Initialization phase is to replace the current preliminary public/private key pair with a new device public/private key pair. This ensures that the customer is in control of his/her devices and that rogue devices cannot be inserted into the customer's system.

The Device Initialization phase can be initiated by the Device or by the IKMS. When initiated by IKMS an RO message is sent to the device to prompt it to send its preliminary certificate (in R1). Typically, the IKMS will initiate this phase. Whether initiated by IKMS or by the device itself, the device provides its preliminary certificate and public key exchange algorithm (KEA) data (in R1). The certificate and public KEA data form a credential. The public KEA data is used in the creation of a session key that is used to secure data transmission between the IKMS and the device in the subsequent IKMS to device message exchange (R2 and R3). The IKMS responds to the preliminary device certificate by providing its certificate, its compatible KEA and public KEA values, an encrypted envelope containing the new device's certificate signed by the IKMS, a data set containing KEA public values and a cryptogram associated with this data set that contains the encrypted private key associated with the signed public certificate (R2).

The Device validates the IKMS message (R2) using the IKMS root certificate chain. The device builds the necessary session key (for decrypting the envelope by using its KEA values and the KEA public values present in the message), and decrypts the envelope. It then builds another session key (necessary to decrypt the private value) from the second set of KEA public values, and decrypts the private key. The device stores both public and private key values in secure non-volatile storage. The previous preliminary public/private key values are destroyed. The new device public/private key values are used in the Secure Transport phase to protect the distribution of key material to the device. The device responds to receipt of the R2 message by sending an acknowledgement (R3) message. The acknowledgement message indicates if the exchange occurred successfully or if it failed.

Upon completion of the Device Initialization phase, the device is ready for delivery of key material using remote rekey (or the secure transport phase of the protocol). The IKMS delivers key to the device using the remote rekey distribution method when a scheduled service is due or when the operator invokes a send key to equipment or send key to service function.

Secure Key Transport Phase

The Secure Key Transport phase is used to deliver operational key material to remote rekey capable devices. This phase of the protocol is invoked during the processing of registered services or during operator requests to send key to services or equipment. The secure key transport phase can be initiated by the IKMS or by the Device.

Figure 14:
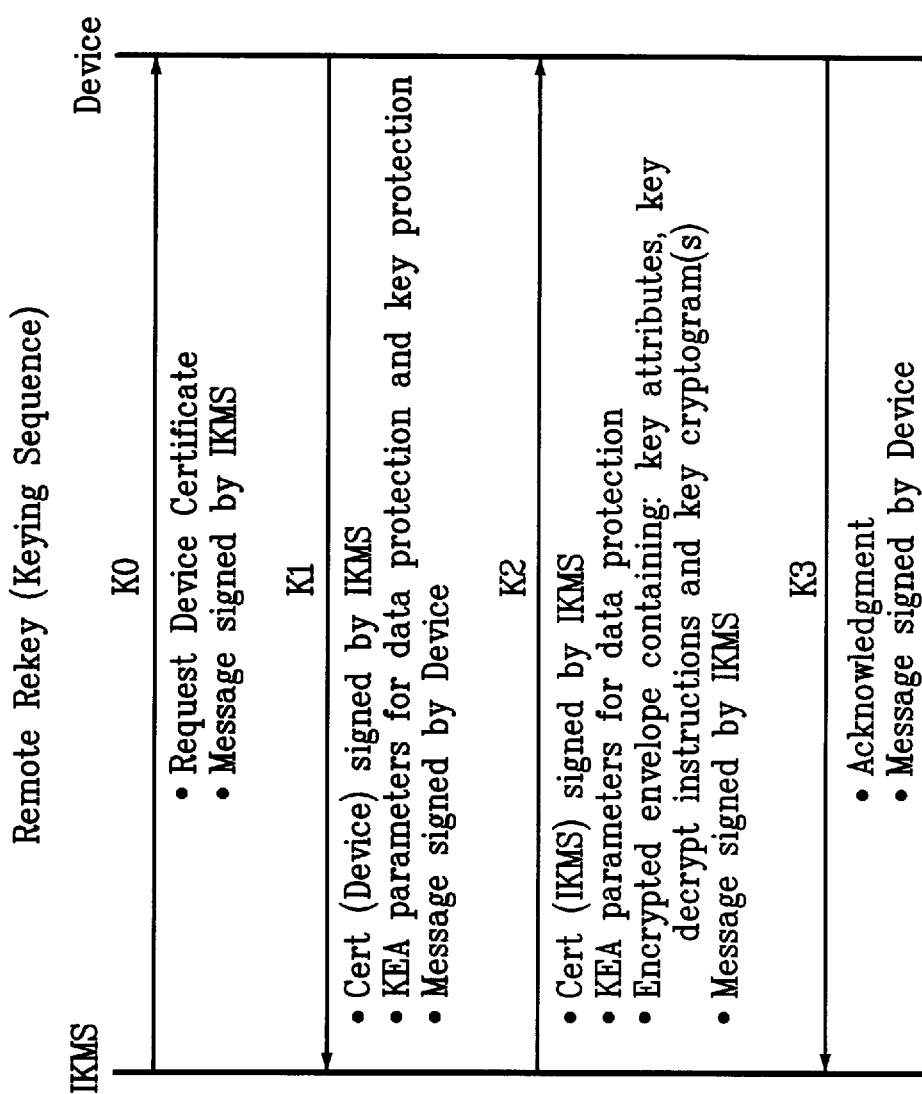
FIG. 14 shows a simplified set of message exchanges that are used to deliver key material securely to a device.

FIG. 14 shows a simplified set of message exchanges that are used to deliver key material securely to a device. The Device Initialization phase must be completed before the Secure Key Transport phase may be undertaken. Multiple keys may be delivered in a single exchange sequence. The message sequence shown can be executed over and over for each subsequent key delivery requested. The exchange of messages between the IKMS and the Device occurs over open networks as the data is encrypted and the messages are signed to prove authenticity. The IKMS root certificate chain is used to verify authenticity. Two layers of encryption are used to protect the key distribution. The first layer provides data protection (privacy) and contains the key tag, key cryptogram and public KEA information used to decrypt the key cryptogram (the decryption instructions). The second layer of encryption protects the key material only. The key tag and its associated key cryptogram are bound together cryptographically by the IKMS signature.

Secure Key Transport can be initiated by the Device or by the IKMS. When initiated by IKMS the KO message is sent to the device to prompt it to send its device certificate (in K1). Whether initiated by the IKMS or by the device itself, the device provides its device certificate and public key exchange algorithm (KEA) data used to create a session key for securing data transmission between the IKMS and the device (in K1). Public KEA data is also provided for use in securing the key package itself. The IKMS responds to the device's certificate (and other data) by providing its certificate; its compatible KEA and public KEA values (for data protection); an encrypted envelope containing the public KEA values (used for decrypting the key cryptogram(s), and a sequence of key tag(s)/key cryptogram(s) (in K2).

The Device validates the IKMS message using the IKMS root certificate chain. The device builds the necessary session key (for decrypting the envelope) by using its KEA values and the KEA public values present in the message. The device decrypts the envelope to reveal the key tag(s), key cryptogram(s) and the public KEA values used to protect the keys. The device then builds the session key necessary to decrypt the key cryptogram(s). The device decrypts the key(s) and then stores them securely inside a tamper resistant/proof boundary.

The device responds to the K2 message by sending a K3 acknowledgement message. This message indicates success or failure in the delivery of the K2 message.

The Secure Transport phase sequence is repeated for each requested delivery task. Multiple keys can be delivered in any given sequence and the secure transport phase can and will be executed many times during the life of the device.

Prototyping of Preferred Embodiments

Several aspects of the IKMS software have been built and tested in order to verify the overall architectural design. This prototyping served to validate overall system architecture and to provide an initial software system infrastructure for the IKMS.

For example, a prototype of the HMI was used to experiment with "modeless" and "modal" windows. As a result of this experimentation, a "modeless" design was selected for implementation. This design allows the operator to bring up multiple windows at the same time and navigate between these windows. Changes on any window that might affect another open window are communicated via an inter-window message. This ensures that the data displayed in an open window is consistent.

The database table structure has been designed and built. The specific database tables needed for the registration functions have been built. The registration function tables are the tables that are used to control the overall IKMS operation. In addition to the database tables, a vehicle for interfacing with the database using "stored procedures" has been built and tested. A software interface to an "ORACLE" database has been built into the software infrastructure of the IKMS.

The software necessary to use a customer's existing electronic mail (e-mail) system to move IKMS data between different sites has been built and tested. This software can interface IKMS to any commercial electronic mail system that is "MICROSOFT" mail application program interface (MAPI) compliant. The ability of the IKMS program to send, receive, and forward mail as if it were a human operator has been built and tested. In addition, the ability to have an operator receive messages that were forwarded by the IKMS software program has been tested.

In the process of defining the IKMS, various alternative solutions have been considered. It should be understood that the IKMS can be implemented using any of a number of computer operating systems, cryptographic hardware accelerators, and software development tools (to generate software code for the IKMS).

A preferred embodiment of the IKMS design includes a graphical user interface, and a computer operating system that provides some inherent protection to the program and data files that make up the IKMS. The "MICROSOFT WINDOWS NT" operating system was chosen as the first operating system in which to implement IKMS. It is anticipated that the IKMS software can be converted to run using a version of the UNIX or secure UNIX operating systems. Note: It may be advantageous to develop all IKMS code in JAVA, as this code is portable to many other operating systems. The current embodiment uses C++. We believe that code implemented in C++ executes faster than the interpreted JAVA code.

During the development of IKMS, various methods for moving key material between IKMS accounts and the equipment using the key material have been considered. To minimize the effect on existing equipment, IKMS supports all of the existing key delivery methods for its anticipated target equipment. One of the major advancements of the IKMS is the ability to also deliver key material to suitably enhanced equipment via the remote rekey mechanism. This mechanism allows key material to be delivered in a secure manner over the existing communications links.

IKMS accounts can exchange key material to support customer needs. This exchange can occur via the transfer of removable magnetic media, via electronic communications using a network protocol, such as simple network management protocol (SNMP), transfer control protocol (TCP), internet protocol (IP), file transfer protocol (FTP), or by using an electronic mail transfer protocol. Electronic mail distribution protocol has been selected as the preferred transfer method. This method was selected due its adaptability to many different hardware platforms and operating systems. This mechanism also provides a level of control over data reception and transmission that is lacking in some of the other schemes.

IKMS is designed to support the commercial data encryption algorithms in use today, such as DES, triple DES, RSA, and DSA. Preferably, IKMS can process RSA modulus lengths between 256 and 2048 bits. As other algorithms become available for commercial use, they can be added to the IKMS capability. For example, it is anticipated that the Advanced Encryption Standard (AES) will be added in the future.

IKMS saves in a secure but retrievable manner all key material distributed to equipment that will be used to encrypt data transactions. In order to support a wide range of customer computer hardware, IKMS has the capability to archive the key material at the time it is created—before it is distributed to equipment for use. This capability requires no special hardware (other than the storage media drive). This archive scheme begins to affect system and operator efficiency when the size of the system becomes large. When large amounts of key material are being processed, the system allows a more traditional approach to key archive. In this approach, RAID technology magnetic disks are used to guarantee the availability of the key material until a convenient time for the operators to perform a bulk write of the archive key data.

IKMS is designed to allow a customer to specify a different cryptographic hardware accelerator for use. The IKMS has a modularized interface for communicating with the cryptographic functions. This modularization allows the IKMS to operate using a software module to perform cryptographic functions or one of a variety of hardware accelerators. Hardware accelerators from Atalla (a Compaq division), Racal, and nCipher have been considered. The preferred embodiment uses the Atalla WebBanking card (a variation of the WebSafe card).

IKMS is designed to operate on any computer system that supports the chosen operating system and has a minimum set of interfaces, sufficient hard disk space to hold the expected amount of key material, and the internal RAM memory to provide the customer's desired throughput.

The "MICROSOFT WINDOWS NT" operating system has been selected due to its widespread availability and use. A system for moving key material between IKMS accounts using electronic mail based transfers has been selected for its wide applicability. The "ATALLA" hardware cryptographic accelerator module has been selected because of its wide acceptance in industry and its highly secure architecture.

Thus there have been described apparatus and methods for managing key material in heterogeneous cryptographic assets. Those skilled in the art will appreciate that numerous changes and modifications may be made to the preferred embodiments of the invention and that such changes and modifications may be made without departing from the spirit of the invention. It should be understood, for example, that although banks have been used throughout this disclosure to describe preferred embodiments of the present invention, the usefulness of the present invention applies to any organization that utilizes cryptographic devices to support secure access to data. It is therefore intended that the appended claims cover all such equivalent variations as fall within the true spirit and scope of the invention.

We claim:

1. A method for remotely rekeying a cryptographic device, comprising:

associating a preliminary certificate with the device;

generating a device certificate associated with the device, wherein the device certificate has a public part and a private part;

determining whether a certificate stored in the device is the preliminary certificate associated with the device; and if the certificate stored in the device is the preliminary certificate associated with the device, then securely loading the device certificate into the device by encrypting the private part of the device certificate using a first encryption algorithm, generating a first packet comprising the public part, the encrypted private part, and a set of decryption instructions for decrypting the encrypted private part, encrypting the first packet using a second encryption algorithm, generating a second packet comprising the encrypted first packet and a set of decryption instructions for decrypting the encrypted first packet, and delivering the second packet to the device.

2. The method of claim 1, wherein associating the preliminary certificate with the device comprises associating the preliminary certificate with a device identifier that corresponds to the device.

3. The method of claim 1, wherein determining whether the certificate stored in the device is the preliminary certificate associated with the device comprises determining whether the certificate has been previously used as a preliminary certificate associated with another cryptographic device.

4. The method of claim 1, further comprising:
loading into the device the preliminary certificate associated with the device.

5. The method of claim 4, wherein loading the preliminary certificate into the device comprises delivering the preliminary certificate to a certificate loader.

6. Apparatus for remotely rekeying a cryptographic device, comprising a computer readable medium having stored thereon computer executable instructions for:
associating a preliminary certificate with the device;
generating a device certificate associated with the device, wherein the device certificate has a public part and a private part;
determining whether a certificate stored in the device is the preliminary certificate associated with the device; and
if the certificate stored in the device is the preliminary certificate associated with the device, then securely loading the device certificate into the device by encrypting the private part of the device certificate using a first encryption algorithm generating a first packet comprising the public part, the encrypted private part, and a set of decryption instructions for decrypting the encrypted private part, encrypting the first packet using a second encryption algorithm, generating a second packet comprising the encrypted first packet and a set of decryption instructions for decrypting the encrypted first packet, and delivering the second packet to the device.

7. Apparatus according to claim 6, further comprising:
a preliminary certificate loader that receives the preliminary certificate from the computer readable medium, and delivers the preliminary certificate to the device.

8. Apparatus according to claim 6, wherein the computer readable medium comprises computer-executable instructions for associating the preliminary certificate with a device identifier that corresponds to the device.

9. Apparatus according to claim 6, wherein the computer readable medium comprises computer-executable instructions for determining whether the certificate has been previously used as a preliminary certificate associated with another cryptographic device.

* * * * *

UNITED STATES PATENT AND TRADEMARK OFFICE
CERTIFICATE OF CORRECTION

PATENT NO.     : 6,442,690 B1
DATED          : August 27, 2002
INVENTOR(S)    : Howard, Jr. et al.

It is certified that error appears in the above-identified patent and that said Letters Patent is hereby corrected as shown below:

Column 17,
Line 29, please delete "manual" and insert -- manually -- therefor.

Column 21,
Line 18, please delete "it" and insert -- its -- therefor.

Column 23,
Line 32, please delete "with" (second occurrence).

Column 28,
Line 10, please delete "the" (second occurrence).

Signed and Sealed this

Twenty-eighth Day of January, 2003

JAMES E. ROGAN
*Director of the United States Patent and Trademark Office*